(12) United States Patent
Horie et al.

(10) Patent No.: US 7,008,744 B2
(45) Date of Patent: *Mar. 7, 2006

(54) OIL BASED INK COMPOSITION FOR INKJET PRINTER

(75) Inventors: Seiji Horie, Shizuoka (JP); Yutaka Sakasai, Shizuoka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 203 days.

This patent is subject to a terminal disclaimer.

(21) Appl. No.: 10/460,304

(22) Filed: Jun. 13, 2003

(65) Prior Publication Data

US 2004/0006158 A1 Jan. 8, 2004

(30) Foreign Application Priority Data

Jun. 18, 2002 (JP) .......................... P. 2002-177379

(51) Int. Cl.
*G03G 9/13* (2006.01)

(52) U.S. Cl. ..................................... 430/114; 106/31.65

(58) Field of Classification Search ................ 430/114; 106/31.43, 31.27, 31.25, 31.47, 31.49, 31.65
See application file for complete search history.

(56) References Cited

U.S. PATENT DOCUMENTS

| | | | | |
|---|---|---|---|---|
| 4,521,505 A | * | 6/1985 | Podszun et al. | ............. 430/112 |
| 5,308,730 A | * | 5/1994 | Suzuki et al. | ............... 430/115 |
| 6,645,281 B1 | * | 11/2003 | Yabuki et al. | ........... 106/31.27 |

FOREIGN PATENT DOCUMENTS

| | | |
|---|---|---|
| JP | 62-3859 | 1/1987 |
| JP | 4-25574 | 1/1992 |
| JP | 6-52432 | 7/1994 |
| JP | 10-138493 | 5/1998 |

* cited by examiner

*Primary Examiner*—John L Goodrow
(74) *Attorney, Agent, or Firm*—Buchanan Ingersoll PC

(57) ABSTRACT

An oil based ink composition for inkjet printer comprising colored resin particles obtained by dispersion polymerization of a monofunctional polymerizable monomer (A) and a macromonomer (M) copolymerizable with the monomer (A) with coloring component fine particles comprising a surface-treated coloring agent, which are dispersed in a non-aqueous solvent having a dielectric constant of from 1.5 to 20 and a surface tension of from 15 to 60 mN/m at 25° C., as seed particles, in the presence of a dispersion stabilizer (P) soluble in the non-aqueous solvent and a polymerization initiator.

9 Claims, 1 Drawing Sheet

OIL BASED INK COMPOSITION FOR INKJET PRINTER

FIELD OF THE INVENTION

The present invention relates to an oil based ink for use in inkjet recording device, which ejects ink to form letters or images on an ink receiving medium such as recording paper. In particular, the invention relates to an oil based ink comprising a colored resin particle in which a coloring component particle of surface-treated coloring agent is further coated with a polymer, an electrophotographic developer, and a process of producing the colored resin particle.

BACKGROUND OF THE INVENTION

Hitherto, there have been known various inkjet recording systems including on-demand ejection systems and continuous ejection systems, as described, for example, in Takeshi Agui, et al., *Real Color Hard Copy*, Sangyo Tosho Co., Ltd. (1993), Shin Ohno, *Non-impact Printing—Technologies and Materials*—, CMC Publishing Co., Ltd. (1986), and Takeshi Amari, *Inkjet Printers—Technologies and Materials*—, published by CMC Publishing Co., Ltd. (1998). Further, the continuous type includes electrostatic systems (for example, Sweet type and Hertz type), and the on-demand type includes a piezoelectric system, a shear mode piezoelectric system, a thermal inkjet system and a recording system called an electrostatic acceleration type. As inks to be used in these inkjet recording systems, aqueous inks that are free from ink clogging in an ink discharge section or an ink supply passage, excellent in discharge stability and good in color image quality, for example, color and gloss are ordinarily used.

As the on-demand type inkjet system using an electrostatic force, systems called electrostatic acceleration type inkjet or slit jet as described, for example, in Susumu Ichinose and Yuji Ohba, *Denshi Tsushin Gakkai Rombunnshi*, Vol. J66-C (No. 1), p.47 (1983), Tadayoshi Ohno and Mamoru Mizuguchi, *Gazo Denshi Gakkaishi*, Vol. 10 (No. 3), p.157 (1981) are known. Specific embodiments thereof are disclosed, for example, in JP-A-56-170 (the term "JP-A" as used herein means an "unexamined published Japanese patent application"), JP-A-56-4467 and JP-A-57-151374. In these systems, an ink is supplied from an ink tank into a slit-like ink chamber having a plurality of electrodes disposed inside a slit-like ink-holding section, and a high voltage is selectively applied to these electrodes, thereby ejecting the ink in the vicinity of the electrode to recording paper closely positioned to the slit-like head.

An electrostatic system of a concentration discharge type without using the slit-like recording head is described in JP-A-10-138493. In this system, a plurality of individual electrodes for allowing an electrostatic force to act on a colorant component in ink are constituted of a control electrode substrate composed of an insulating substrate having a through-hole formed therein and a control electrode formed corresponding to the through-hole and a convex ink guide arranged in the substantially center position of the through-hole, the ink is carried on the surface of a convex ink guide to an ink droplet ejecting position by a surface tension, and a prescribed voltage is applied to the control electrode to eject ink droplet to a recording medium, thereby conducting recording.

As inks to be used for these various inkjet recording systems, inks prepared by dissolving various water-soluble dyes in water or a solvent composed of water and a water-soluble organic solvent and optionally adding various additives thereto (hereinafter referred to as "aqueous dye ink") are mainly employed. However, in the case where printing is practically carried out using the aqueous dye ink, many drawbacks are encountered in that the ink blurs on recording paper depending on the kind of paper, whereby high-quality print can not be obtained, in that a formed recorded image is poor in water resistance and light fastness, in that drying of ink on recording paper is so slow that streaks occur, and in that a recorded image is deteriorated due to color mixing (color turbidity or color unevenness occurred on the interface when dots having different colors are printed adjacent to each other).

For improving the water resistance and light fastness of recorded image that are the problems of aqueous dye ink as described above, there have been made various proposals to apply pigment based ink comprising fine particles of a pigment dispersed in an aqueous solvent or a non-aqueous solvent to the inkjet recording system. For example, inks for inkjet printer comprising a pigment dispersed in a solvent mainly composed of water are proposed in JP-A-2-255875, JP-A-3-76767, JP-A-3-76768, JP-A-56-147871 and JP-A-56-147868. However, there is a problem in that since the pigment is insoluble in the medium, dispersion stability of the ink is ordinarily poor to likely cause clogging in a nozzle section.

On the other hand, ink comprising a pigment dispersed in a non-polar insulating solvent (hereinafter referred to as "oil based pigment ink") has advantages in that it is less in blur due to good absorption on paper and in that a recorded image is good in water resistance. For example, JP-A-57-10660 proposes oil based pigment ink in which a pigment is pulverized with an alcoholamide dispersant, and JP-A-57-10661 proposes oil based pigment ink in which a pigment is pulverized with a sorbitan based dispersant. However, such inks still have a problem in that clogging of ink in a nozzle section is liable to occur, because it is not sufficient to uniformly disperse the pigment particles in the state of fine particles in the non-polar insulating solvent and the dispersion stability thereof is inferior. In addition, there is a large defect in that the ink is poor in scratch resistance because the pigment itself does not have a fixing ability on recording paper.

For resolving these problems, there are proposed resin dissolution type oil based inks using a resin soluble in a non-polar insulating solvent as a fixing agent and a pigment dispersant. For example, JP-A-3-234772 proposes a terpene phenol based resin as the above-described resin. However, the proposed resin is still insufficient with respect to dispersion stability of pigment and is questionable in reliability as ink. Moreover, since the resin is dissolved in the non-polar solvent, the resin does not remain in an amount sufficient for completely fixing the pigment on recording paper, so that water resistance and scratch resistance are not sufficient.

Thus, for obtaining high-level scratch resistance, it is proposed to coat pigment particles with a resin insoluble or semi-soluble in the non-polar insulating solvent. For example, JP-A-4-25574 proposes oil based ink comprising a pigment coated with a resin by microencapsulation, etc. However, since it is difficult to uniformly disperse the pigment-included resin particles in the state of fine particle and dispersion stability thereof is not sufficient, there is a problem in reliability as ink.

In addition, in recent years, high image quality with photographic image quality is attained by ordinary inkjet printers using the aqueous dye ink. With respect to the pigment ink, for increasing color forming property and transparency, it is required to make pigment fine as far as possible and to keep the dispersion state thereof stably.

However, in contrast, when the pigment is made finer, crushing of pigment primary particles occurs simultaneously with pulverization of the pigment. Further, since cohesive energy simultaneously becomes large due to increase of surface energy, re-coagulation of the pigment particles is apt to occur. As a result, a problem occurs in that storage stability of the pulverized pigment dispersion is damaged. As described above, with respect to the pigment dispersion used in oil based pigment ink for inkjet printer, pulverization at a higher level is required. However, high-level techniques are required for dispersing pigment in the state of fine particle, and it is very difficult to increase the dispersion stability thereof. Therefore, it is the actual situation that oil based pigment ink capable of meeting the above-described requirements is hardly available.

Moreover, in the case where such oil based pigment ink is used for an electrostatic inkjet printer or as an electrophotographic liquid developer, control of charge polarity and stability of the charge with the lapse of time are required. However, since it is very difficult to control the polarity on the pigment surface, it is the actual situation that oil based pigment ink capable of meeting the above-described requirements is hardly available. The electrophotographic liquid developer using a non-aqueous solvent is ordinarily produced by pulverizing a mixture comprising an aliphatic hydrocarbon solvent, a coloring agent, a fixing resin and a dispersant, and optionally added various additives in a ball mill or an attritor, etc. Various methods for the production thereof have been proposed. On the other hand, JP-A-63-174070 discloses a colored liquid developer comprising as a coloring agent, a polymer latex dyed with a dye, wherein the polymer latex is obtained by polymerization of styrene or an acrylic monomer in a non-aqueous solvent. However, the method of using a dye as the coloring agent has defects in that preparation of a black liquid developer is difficult, in that an image density is low because of the dye system, and in that light fading occurs. As an example using a pigment as the coloring agent, JP-B-62-3859 (the term "JP-B" as used herein means an "examined Japanese patent publication") proposes an electrophotographic liquid developer containing a pigment and as a fixing resin, a resin obtained by reacting a natural resin-modified thermosetting resin with a long chain alkyl group-containing monomer. Although the effect for improving dispersion stability of coloring agent is found, the electrophotographic liquid developer is still insufficient in the dispersion stability. Thus, with respect to the electrophotographic liquid developer using a pigment as the coloring agent, sufficient dispersion stability as well as scratch resistance have been desired. In addition, since pigments are different in a charge polarity depending on the kinds thereof, it has been desired to make the charge polarity of pigment particle clear and to prevent change of the charge polarity with the lapse of time.

SUMMARY OF THE INVENTION

Therefore, an object of the invention is to provide an oil based ink for inkjet printer in which a pigment is uniformly dispersed in the state of fine particle and dispersion stability of the pigment dispersion is excellent, and which has high discharge stability free from the occurrence of clogging in a nozzle section.

Another object of the invention is to provide an oil based ink for inkjet printer, which has excellent drying property on recording paper, excellent water resistance and light fastness of recorded image, and high-level scratch resistance.

A further object of the invention is to provide an oil based ink for electrostatic inkjet printer, which is excellent not only in dispersion stability and scratch resistance but also in control of charge polarity and stability of charge with the lapse of time.

A still further object of the invention is to provide an electrophotographic liquid developer, which is excellent not only in dispersion stability and scratch resistance but also in control of charge polarity and stability of charge with the lapse of time.

A still further object of the invention is to provide a production process for obtaining ink for inkjet printer comprising resin particles including a pigment uniformly dispersed in the state of fine particle.

Other objects of the invention will become apparent from the following description.

It has been found that the above-described objects can be attained by the following constructions.

(1) An oil based ink composition for inkjet printer comprising colored resin particles obtained by dispersion polymerization of a monofunctional polymerizable monomer (A) and a macromonomer (M) copolymerizable with the monomer (A) with coloring component fine particles comprising a surface-treated coloring agent, which are dispersed in a non-aqueous solvent having a dielectric constant of from 1.5 to 20 and a surface tension of from 15 to 60 mN/m at 25° C., as seed particles, in the presence of a dispersion stabilizer (P) soluble in the non-aqueous solvent and a polymerization initiator.

(2) The oil based ink composition for inkjet printer as described in item (1) above, wherein the macromonomer (M) is a macromonomer having a weight average molecular weight of from $1 \times 10^3$ to $4 \times 10^4$ in which a polymerizable double bond group represented by formula (I) shown below is connected to a terminal of the main chain of a polymer comprising a repeating unit represented by formula (II) shown below.

(I)

In formula (I), V represents —COO—, —OCO—, —(CH$_2$)$_m$—OCO—, —(CH$_2$)$_m$—COO—, —O—, —CONHCOO—, —CONHCO—, —SO$_2$—, —CO—, —CON(Z$^1$)-, —SO$_2$N(Z$^1$)- or a phenylene group (hereinafter, the phenyl group is represented by "-Ph-" and the "-Ph-" includes a 1,2-phenylene group, a 1,3-phenylene group and a 1,4-phenylene group). Z$^1$ represents a hydrogen atom or a hydrocarbon group, and m represents an integer of from 1 to 3.

a$^1$ and a$^2$, which may be the same or different, each represent a hydrogen atom, a halogen atom, a cyano group, a hydrocarbon group, —COO-Z$^2$ or —COO-Z$^2$ linked through a hydrocarbon group, in which Z$^2$ represents a hydrogen atom or a hydrocarbon group.

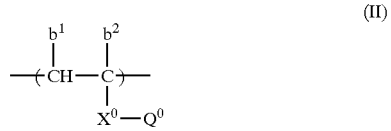

In formula (II), $X^0$ represents a connecting group selected from —COO—, —OCO—, —$(CH_2)_n$—OCO—, —$(CH_2)_n$—COO—, —O—, —CONHCOO—, —CONHCO—, —$SO_2$—, —CO—, —CON ($Z^3$)- and —$SO_2N$($Z^3$)-, in which $Z^3$ represents a hydrogen atom or a hydrocarbon group, and n represents an integer of from 1 to 3. $b^1$ and $b^2$, which may be the same or different, each have the same meanings as defined for $a^1$ and $a^2$ of formula (I). $Q^0$ represents an aliphatic group having from 1 to 22 carbon atoms.

(3) The oil based ink composition for inkjet printer as described in item (1) above, wherein the surface-treated coloring agent is an organic or inorganic pigment coated with a polymer.

(4) The oil based ink composition for inkjet printer as described in item (1) above, wherein the coloring component fine particles are those dispersed with a pigment dispersant in the non-aqueous solvent and having an average particle diameter of from 0.01 to 1.0 μm.

(5) An electrophotographic liquid developer comprising colored resin particles obtained by dispersion polymerization of a monofunctional polymerizable monomer (A) and a macromonomer (M) copolymerizable with the monomer (A) with coloring component fine particles comprising a surface-treated coloring agent, which are dispersed in a non-aqueous solvent having a volume resistivity of $10^9$ Ωcm or more, as seed particles, in the presence of a dispersion stabilizer (P) soluble in the non-aqueous solvent and a polymerization initiator.

(6) The electrophotographic liquid developer as described in item (5) above, wherein the macromonomer (M) is a macromonomer having a weight average molecular weight of from $1 \times 10^3$ to $4 \times 10^4$ in which a polymerizable double bond group represented by formula (I) described in item (2) above is connected to a terminal of the main chain of a polymer comprising a repeating unit represented by formula (II) described in item (2) above.

(7) The electrophotographic liquid developer as described in item (5) above, wherein the surface-treated coloring agent is an organic or inorganic pigment coated with a polymer.

(8) The electrophotographic liquid developer as described in item (5) above, wherein the coloring component fine particles are those dispersed with a pigment dispersant in the non-aqueous solvent and having an average particle diameter of from 0.01 to 1.0 μm.

(9) A process of producing colored resin particles comprising performing dispersion polymerization of a dispersion comprising a monofunctional polymerizable monomer (A), a macromonomer (M) copolymerizable with the monomer (A), coloring component fine particles comprising a surface-treated coloring agent, which are dispersed in a non-aqueous solvent having a dielectric constant of from 1.5 to 20 and a surface tension of from 15 to 60 mN/m at 25° C., as seed particles, and a dispersion stabilizer (P) soluble in the non-aqueous solvent in the presence of a polymerization initiator.

(10) The process of producing colored resin particles as described in item (9) above, wherein the macromonomer (M) is a macromonomer having a weight average molecular weight of from $1 \times 10^3$ to $4 \times 10^4$ in which a polymerizable double bond group represented by formula (I) described in item (2) above is connected to a terminal of the main chain of a polymer comprising a repeating unit represented by formula (II) described in item (2) above.

(11) The process of producing colored resin particles as described in item (9) above, wherein the surface-treated coloring agent is an organic or inorganic pigment coated with a polymer.

(12) The process of producing colored resin particles as described in item (9) above, wherein the coloring component fine particles are those dispersed with a pigment dispersant in the non-aqueous solvent and having an average particle diameter of from 0.01 to 1.0 μm.

DETAILED DESCRIPTION OF THE INVENTION

Figure 1:
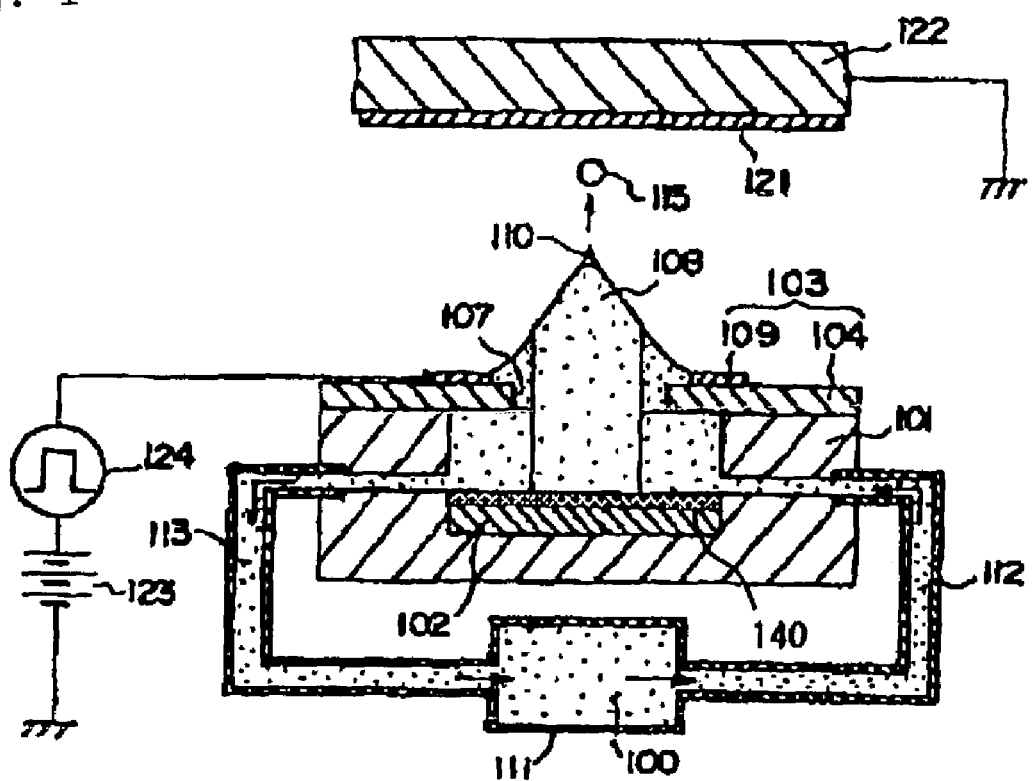
FIG. 1 is a sectional view of an inkjet head including an ejection electrode corresponding to a recording dot.

The invention will be described below in detail.

A non-aqueous dispersion medium that is used in the oil based ink composition for inkjet printer according to the invention is a non-polar insulating solvent and preferably has a dielectric constant of from 1.5 to 20 and a surface tension of from 15 to 60 mN/m at 25° C. Also, a non-aqueous dispersion medium that is used in the electrophotographic liquid developer according to the invention preferably has a volume resistivity of $10^9$ Ωcm or more. Characteristics further desired include that toxicity is low, that flammability is low and that odor is low.

The non-aqueous dispersion media include straight chain or branched aliphatic hydrocarbons, alicyclic hydrocarbons, aromatic hydrocarbons, petroleum naphthas and halogen-substituted products thereof. Examples thereof include hexane, octane, isooctane, decane, isodecane, Decalin®, nonane, dodecane, isododecane, Isopar E®, Isopar G®, Isopar H® and Isopar L® (manufactured by Exxon), Solutol® (manufactured by Phillips Oil), IP Solvent (manufactured by Idemitsu Petrochemical Co., Ltd.), and petroleum naphthas including S.B.R., Shellsol 70® and Shellsol 71® (manufactured by Shell Petrochemical) and Vegasol® (manufactured by Mobil Oil). The solvents can be used individually or in combination.

The hydrocarbon solvents are preferably high-purity isoparaffinic hydrocarbons having a boiling point in the range of from 150 to 350° C. Examples of commercially available products include Isopar G®, Isopar H®, Isopar L®, Isopar M® and Isopar V® (trade names, manufactured by Exxon Chemical), Norpar 12®, Norpar 13® and Norpar 15® (trade names, manufactured by Exxon Chemical), IP Solvent 1620® and IP Solvent 2028® (trade names, manufactured by Idemitsu Petrochemical Co., Ltd.), Isosol 300® and Isosol 400® (trade names, manufactured by Nippon Pertochemicals), and Amsco OMS® and Amsco 460® solvents (trade names, manufactured by American Mineral Spirits Corp.). These products are composed of an aliphatic saturated hydrocarbon having an extremely high purity, and have a viscosity at 25° C. of 3 cSt or less, a surface tension at 25° C. of from 22.5 to 28.0 mN/m, and a volume resistivity at 25° C. of $10^{10}$ Ω·cm or more. Further, these products have characteristics such that they are stable due to low reactivity and are safe due to low toxicity and that their odors are low.

The halogen-substituted hydrocarbon solvents include fluorocarbon solvents. Examples thereof include perfluoroalkanes represented by $C_nF_{2n+2}$, for example, $C_7F_{16}$ and $C_8F_{18}$ (for example, Fluorinert PF5080® and Fluoriner PF5070® (trade names, manufactured by Sumitomo 3M)), fluorine based inert liquids (for example, Fluorinert® FC Series (trade names, manufactured by Sumitomo 3M)), fluorocarbons (for example, Krytox® GPL Series (trade names, manufactured by DuPont Japan Ltd.)), fleons (for example, HCFC-141b® (a trade name, manufactured by Daikin Industries, Ltd.), and iodinated fluorocarbons for example, $F(CF_2)_4CH_2CH_2I$ and $F(CF_2)_6I$ (for example, I-1420® and I-1600® (trade names, manufactured by Daikin Fine Chemical Laboratory, Ltd.).

As the non-aqueous solvent that is used in the invention, higher fatty acid esters and silicone oils can also be used. Specific examples of the silicone oil include low-viscosity synthetic dimethylpolysiolxanes, which are commercially available, for example, KF96L (a trade name, manufactured by Shin-Etsu Silicone) and SH200 (a trade name, manufactured by Dow Corning Toray Silicone).

The silicone oils are not limited to these specific examples. As the dimethylpolysiloxanes, those having a very broad viscosity range are available depending on the molecular weight, but those having a viscosity at 25° C. in the range of from 1 to 20 cSt are preferably used. Similar to the isoparaffinic hydrocarbons, the dimethylpolysiloxanes have a volume resistivity at 25° C. of $10^{10}$ Ω·cm or more and have characteristics, for example, high stability, high safety and odorlessness. Further, the dimethylpolysiloxanes are characterized by a low surface tension, i.e., the surface tension is from 18 to 21 mN/m at 25° C.

Examples of solvents that can be used together with the above-described organic solvents include alcohols (for example, methyl alcohol, ethyl alcohol, propyl alcohol, butyl alcohol and fluorinated alcohol), ketones (for example, acetone, methyl ethyl ketone and cyclohexanone), carboxylic acid esters (for example, methyl acetate, ethyl acetate, propyl acetate, butyl acetate, methyl propionate and ethyl propionate), ethers (for example, diethyl ether, dipropyl ether, tetrahydrofuran, and dioxane), and halogenated hydrocarbons (for example, methylene dichloride, chloroform, carbon tetrachloride, dichloroethane and methylchloroform).

Now, the surface-treated coloring component of the invention will be described below in detail.

The surface-treated coloring component of the invention (hereinafter also referred simply to as "coloring component" sometimes) is prepared by surface treatment of a coloring agent. The coloring agent is not particularly limited and includes any ordinarily commercially available organic pigments and inorganic pigments.

Examples of coloring agents that exhibit yellow color include mono-azo pigments, for example, C.I. Pigment Yellow 1 (Fast Yellow G, etc.) and C.I. Pigment Yellow 74; dis-azo pigments, for example, C.I. Pigment Yellow 12 (Disazo Yellow AAA, etc.) and C. I. Pigment Yellow 17; non-benzidine based azo pigments, for example, C.I. Pigment Yellow 180; azo lake pigments, for example, C.I. Pigment Yellow 100 (Tartrazine Yellow Lake, etc.); condensed azo pigments, for example, C.I. Pigment Yellow 95 (Condensed Azo Yellow GR, etc.); acidic dye lake pigments, for example, C.I. Pigment Yellow 115 (Quinoline Yellow Lake, etc.); basic dye lake pigments, for example, C. I. Pigment Yellow 18 (Thioflavin Lake, etc.); anthraquinone based pigments, for example, Flavanthrone Yellow (Y-24); isoindolinone pigments, for example, Isoindolinone Yellow 3RLT (Y-110); quinophthalone pigments, for example, Quinophthalone Yellow (Y-138); isoindoline pigments, for example, Isoindoline Yellow (Y-139); nitroso pigments, for example, C. I. Pigment Yellow 153 (Nickel Nitroso Yellow, etc.); and metal complex azomethine pigments, for example, C.I. Pigment Yellow 117 (copper Azomethine Yellow, etc.).

Examples of coloring agents that exhibit magenta color include mono-azo pigments, for example, C.I. Pigment Red 3 (Toluidine Red, etc.); dis-azo pigments, for example, C.I. Pigment Red 38 (Pyrazolone Red B, etc.); azo lake pigments, for example, C.I. Pigment Red 53:1 (Lake Red C, etc.) and C.I. Pigment Red 57:1 (Brilliant Carmine 6B); condensed azo pigments, for example, C.I. Pigment Red 144 (Condensed Azo Lake BR, etc.); acidic dye lake pigments, for example, C.I. Pigment Red 174 (Phloxine B Lake, etc.); basic dye lake pigments, for example, C.I. Pigment Red 81 (Rhodamine 6G' Lake, etc.); anthraquinone based pigments, for example, C.I. Pigment Red 177 (Dianthraquinonyl Red, etc.); thioindigo pigments, for example, C.I. Pigment Red 88 (for example, Thioindigo Bordeaux, etc.); perinone pigments, for example, C.I. Pigment Red 194 (Perinone Red, etc.); perylene pigments, for example, C.I. Pigment Red 149 (Perylene Scarlet, etc.); quinacridone pigments, for example, C.I. Pigment Red 122 (Quinacridone Magenta, etc.); isoindolinone pigments, for example, C.I. Pigment Red 180 (Isoindolinone Red 2BLT, etc.); and arizalin lake pigments, for example, C.I. Pigment Red 83 (Madder Lake, etc.).

Examples of pigments that exhibit cyan color include dis-azo pigments, for example, C.I. Pigment Blue 25 (Dianisidine Blue, etc.); phthalocyanine pigments, for example, C.I. Pigment Blue 15 (Phthalocyanine Blue, etc.); acidic dye lake pigments, for example, C.I. Pigment Blue 24 (Peacock Blue Lake, etc.); basic dye lake pigments, for example, C.I. Pigment Blue 1 (Victoria Pure Blue BO Lake, etc.); anthraquinone based pigments, for example, C.I. Pigment Blue 60 (Indanthrone Blue, etc.); and alkali blue pigments, for example, C.I. Pigment Blue 18 (Alkali Blue V-5:1).

Examples of pigments that exhibit black color include organic pigments, for example, aniline black based pigments such as BK-1 (Aniline Black), iron oxide pigments, and carbon black pigments, for example, furnace black, lamp black, acetylene black and channel black.

Also, metallic powders are employable for attaining color reproduction, for example, gold, silver or copper color.

The surface treatment methods of coloring agent are described in *Pigment Dispersing Technologies*, Chapter 5, Gijutsu Joho Kyokai Co., Ltd., and examples thereof include rosin treatment, polymer treatment, grafting treatment and plasma treatment.

The "rosin treatment" as referred to herein includes a method in which a pigment and rosin are mechanically kneaded to treat the surface of the pigment with rosin and a method in which after adding an alkaline aqueous solution of rosin to an aqueous slurry of a pigment, an alkaline earth metal salt or an acid is added to the mixture to deposit a sparingly soluble salt or free acid of rosin on the surfaces of pigment particles. In the rosin treatment, the rosin is ordinarily used in an amount of from several % to about 20%. The rosin treatment brings about the following large effects: (1) fine and highly transparent pigment is obtained due to the effect for preventing crystal growth of the pigment; (2) mechanical dispersion is easy conducted because of small cohesive forth of particle in drying; and (3) wetting property to an oil based vehicle is improved by increasing oleophilicity on the pigment surface. In particular, the rosin treatment is widely used in the field of printing inks.

The "grafting treatment" as referred to herein is to conduct a grafting reaction of functional group (for example, a hydroxy group, a carboxy group or an amino group) present on the surfaces of inorganic fine particle, for example, carbon black, silica or titanium oxide, or organic pigment with a polymer. The grafting reaction of the polymer to the pigment surface includes (1) a method in which a vinyl monomer is polymerized in the presence of pigment fine particles using a polymerization initiator and the growing of polymer formed in the system is terminated at the functional group on the pigment fine particle surface, (2) a method in which a graft chain is grown from a polymerization initiating group introduced on the pigment fine particle surface and (3) a method of a polymer reaction between the functional group on the pigment fine particle surface and a terminal functional group of the polymer.

The "plasma treatment" as referred to herein is to conduct modification of the pigment powder surface with low-temperature plasma or thermal plasma. Specific examples of the treatment of the pigment surface with low-temperature plasma include (1) modification by plasma irradiation with a non-polymerizable gas, for example, oxygen or nitrogen, (2) modification by formation of plasma polymerized film using a polymerizable gas and (3) modification by a two-stage plasma initiation graft polymerization reaction comprising a first stage for forming an active species on the pigment surface by plasma irradiation and a second stage for bringing the active species into contact with a monomer to proceed graft polymerization as the post reaction.

From the viewpoints that dispersibility of the coloring agent is enhanced and that the dispersed coloring component as seed particle is subjected to dispersion polymerization in a non-aqueous solvent, the following polymer treatments are preferred.

Representative examples of the polymer treatment include a chemical method of utilizing an in-situ polymerization method as described in *Pigment Dispersing Technologies*, page 99, et seq., Gijutsu Joho Kyokai Co., Ltd., a method of utilizing a phase separation method (coacervation), and a method of conducting treatment by a mechanical force during pigment dispersion.

The in-situ polymerization method includes a method in which a system of pigment and polymer is dispersed and then subjected to suspension polymerization, a method in which a pigment is dispersed in an aqueous system in the presence of a dispersant and to the dispersion are added a polar polymer, a vinyl based polymer and a polyfunctional crosslinking polymer to undergo polymerization and a method in which a dispersion of a monomer and a pigment is subjected to bulk polymerization and then to suspension polymerization or emulsion polymerization, thereby thoroughly achieving adsorption onto the pigment. The phase separation method (coacervation) includes a method in which a pigment is dispersed in a polymer solution, and the solubility of the polymer is reduced by an appropriate method to deposit the polymer from the solution system on the pigment particle. This method is characterized in that the polymer can be selected from a wide range, in comparison with the chemical method (in-situ polymerization method). There are widely used a method in which a nonsolvent is added to a resin solution having a pigment dispersed therein to deposit the resin on the pigment surface and a method in which a pigment is finely dispersed in a water-soluble polymer or water-soluble resin solution, then the pH is adjusted to deposit the polymer or resin on the pigment surface, inclusive of the rosin treatment. When a pigment is dispersed in an acid solution of an acid-soluble nitrogen-containing acrylic resin and then the pH thereof is increased to insolubilize the polymer on the pigment surface, effects, for example, prevention of coagulation and improvements in fluidity, gloss and coloring power are recognized in paint and printing ink. As an example of the method of polymer treatment by a mechanical force, a method wherein a polymer and a pigment are previously mixed such that the pigment content is from 5 to 95%, the mixture is kneaded by a kneader, three rolls, etc. while heating, and the kneaded mixture is then pulverized by a pin mill, etc. A method called flushing resin treatment is also included in the mechanical polymer treatment method.

As the resin that is used in the polymer treatment, resins capable of not only enhancing dispersibility of a pigment in a non-aqueous solvent but also imparting heat dispersion stability during dispersion polymerization in the non-aqueous solvent using the dispersed coloring component fine particles as seed particles are preferred. Resins that are conventionally used in liquid developers can also be used.

As the resin, resins having a segment solvating with a solvent, a segment hardly solvating with a solvent and a polar group-containing segment for the purposes of adsorbing on a coloring agent and having a function of well dispersing the coloring agent in a non-aqueous solvent are preferably used. Examples of the monomer that solvates with a solvent after polymerization include lauryl methacrylate, stearyl methacrylate, 2-ethylhexyl methacrylate and cetyl methacrylate. Examples of the monomer that hardly solvates with a solvent after polymerization include methyl methacrylate, ethyl methacrylate, isopropyl methacrylate, styrene and vinyltoluene. Examples of the polar group-containing monomer include an acid group-containing monomers, for example, acrylic acid, methacrylic acid, itaconic acid, fumaric acid, maleic acid, styrenesulfonic acid and an alkali metal salt thereof and a basic group-containing monomer, for example, dimethylamonoethyl methacrylate, diethylaminoethyl methacrylate, vinylpyridine, vinylpyrolidone, vinylpiperidine and vinyllactam.

Specific examples of the resin for use in the polymer treatment include olefin polymers and copolymers (for example, polyethylene, polypropylene, polyisobutylene, ethylene-vinyl acetate copolymers, ethylene-acrylate copolymers, ethylene-methacrylate copolymers, and ethylene-methacrylic acid copolymers), polymers and copolymers of styrene or derivatives thereof (for example, butadiene-styrene copolymers, isoprene-styrene copolymers, styrene-methacrylate copolymers, and styrene-acrylate copolymers), acrylic acid ester polymers and copolymers, methacrylic acid ester polymers and copolymers, itaconic acid diester polymers and copolymers, maleic anhydride copolymers, rosin resins, hydrogenated rosin resins, petroleum resins, hydrogenated petroleum resins, maleic acid resins, terpene resins, hydrogenated terpene resins, chroman-indene resins, cyclized rubber-methacrylic acid ester copolymers and cyclized rubber-acrylic acid ester copolymers.

In the invention, a weight ratio of the coloring agent to the resin to be used in the polymer treatment is preferably in the range of from 95/5 to 5/95, and more preferably from 80/20 to 10/90.

Further, as the surface-treated coloring component, ordinarily commercially available processed pigment can be used. Specific examples of the commercially available processed pigment include Microlith pigments manufactured by Ciba Specialty Chemicals. Preferred examples of the processed pigment include Microlith-T pigment in which pigment is coated with a rosin ester resin.

In the invention, the above-described surface-treated coloring component is dispersed in the state of fine particles in a non-aqueous solvent to obtain coloring component fine particles, which are used as seed particles in the subsequent dispersion polymerization. First of all, the dispersion step of the coloring component is described.

In the dispersion step, in order to disperse the coloring component in the state of fine particles and to stabilize the dispersion in the non-aqueous solvent, it is preferred to use a pigment dispersant.

As the pigment dispersant for dispersing the surface-treated coloring component in the state of fine particles in a non-aqueous dispersion medium, which can be used in the invention, conventional pigment dispersants applied to the non-aqueous dispersion medium are used. Any pigment dispersants can be used so far as they are compatible with the above-described non-polar insulating solvent and can stably disperse the coloring component in the state of fine particles.

Specific examples of pigment dispersant include nonionic surfactants, for example, sorbitan fatty acid esters (e.g., sorbitan monooleate, sorbitan monolaurate, sorbitan sesquioleate and sorbitan trioelate), polyoxyethylene sorbitan fatty acid esters (e.g., polyoxyethylene sorbitan monostearate and polyoxyethylene sorbitan monooleate), polyethylene glycol fatty acid esters (e.g., polyethylene glycol monostearate and polyethylene glycol diisostearate), polyoxyethylene alkylphenyl ethers (e.g., polyoxyethylene nonylphenyl ether and polyoxyethylene octylphenyl ether), and aliphatic diethanolamides. Further, as high-molecular dispersants, high-molecular compounds having a molecular weight of 1,000 or more are preferable. Examples thereof include styrene-maleic acid resins, styrene-acrylic resins, rosins, BYK-160, BYK-162, BYK-164 and BYK-182 (urethane based high-molecular compounds manufactured by BYK-Chemie), EFKA-47 and LP-4050 (urethane based dispersants manufactured by EFKA), Solsperse 24000 (polyester based high-molecular compound manufactured by Zeneca PLC), and Solsperse 17000 (aliphatic diethanolamide based high-molecular compound manufactured by Zeneca PLC).

Other examples of the high-molecular pigment dispersant include random copolymers comprising a monomer that solvates with a solvent (for example, lauryl methacrylate, stearyl methacrylate, 2-ethylhexyl methacrylate and cetyl methacrylate), a monomer that hardly solvates with a solvent (for example, methyl methacrylate, ethyl methacrylate, isopropyl methacrylate, styrene and vinyltoluene) and a polar group-containing monomer, and the graft copolymers described in JP-A-3-188469. Examples of the polar group-containing monomer include an acid group-containing monomer, for example, acrylic acid, methacrylic acid, itaconic acid, fumaric acid, maleic acid, styrene sufonic acid and an alkali metal salt thereof, and a basic group-containing monomer, for example, dimethylamonoethyl methacrylate, diethylaminoethyl methacrylate, vinylpyridine, vinylpyrrolidone, vinylpiperidine and vinyllactam. In addition, styrene-butadiene copolymers and the block copolymers of styrene and a long chain alkyl methacrylate as described in JP-A-60-10263 are enumerated. Preferred examples of the pigment dispersant include the graft copolymers described in JP-A-3-188469.

The amount of the pigment dispersant used is preferably from 0.1 to 300 parts by weight based on 100 parts by weight of the surface-treated coloring agent. When the amount of pigment dispersant added is less than 0.1 parts by weight, the effect for dispersing the coloring agent is low, and hence, such is not preferred. On the other hand, even when it exceeds 300 parts by weight, no further improving effect is obtained.

A method of using the pigment dispersant in the dispersion of the surface-treated coloring agent (coloring component) in the non-aqueous dispersion medium includes the following methods, and any of these methods can achieve the desired effects.

1. A coloring component composition obtained by previously mixing the surface-treated coloring agent with the pigment dispersant is added and dispersed in the non-aqueous solvent.
2. The surface-treated coloring agent and the pigment dispersant are individually added and dispersed in the non-aqueous solvent.
3. Dispersions previously obtained by individually dispersing the surface-treated coloring agent and the pigment dispersant in the non-aqueous solvent are mixed with each other.
4. The surface-treated coloring agent is dispersed in the non-aqueous solvent and then the pigment dispersant is added to the resulting coloring component dispersion.

The above-described surface-treated coloring agent (coloring component) is mixed or dispersed in the non-aqueous solvent to prepare coloring component fine particles, preferably in the presence of the pigment dispersant. A machine used for conducting the mixing or dispersion in the non-aqueous solvent includes, for example, a dissolver, a high-speed mixer, a homomixer, a kneader, a ball mill, a roll mill, a sand mill and an attritor. The coloring component (for example, processed pigment) has an average particle size in the range of from 0.01 to 10 $\mu$m. The coloring component obtained by such a dispersing step preferably has an average particle size ranging from 0.01 to 1.0 $\mu$m.

Now, a step in which a monofunctional polymerizable monomer (A) and a macromonomer (M) are added to the dispersed coloring component fine particles as seed particles to conduct dispersion polymerization will be described below.

A polymerization system comprising the coloring component fine particles, as seed particles, dispersed in the non-aqueous solvent, a monofunctional polymerizable monomer (A), a macromonomer (M) and a dispersion stabilizer (P) is polymerized in the presence of a polymerization initiator to obtain colored resin particles having the coloring agent included therein according to the invention.

The colored resin particle according to the invention is a particle having a two-layer structure composed of a core layer comprising the coloring component fine particle, which is a seed particle, and a shell layer present outside the core layer. The shell layer insoluble in the non-aqueous solvent is formed by copolymerization of the monomer (A) and the macromonomer (M).

It is preferred that the monofunctional polymerizable monomer (A) is a polymerizable monomer that is soluble in the non-aqueous solvent but becomes insoluble in the non-aqueous solvent upon polymerization.

Specific examples of the monomer (A) include polymerizable monomers represented by the following formula (III):

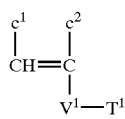

(III)

In formula (III), $V^1$ represents —COO—, —OCO—, —CH$_2$OCO—, —CH$_2$COO—, —O—, —CONHCOO—, —CONHOCO—, —SO$_2$—, —CON(Z$^{11}$)-, —SO$_2$N(Z$^{11}$)- or a phenylene group (hereinafter also referred to as "-Ph-" sometimes; the phenylene group includes a 1,2-phenylene group, a 1,3-phenylene group and a 1,4-phenylene group). $Z^{11}$ represents a hydrogen atom or an aliphatic group having from 1 to 8 carbon atoms, which may be substituted (for example, a methyl group, an ethyl group, a propyl group, a butyl group, a 2-chloroethyl group, a 2-bromoethyl group, a 2-cyanoethyl group, a 2-hydroxyethyl group, a benzyl group, a chlorobenzyl group, a methylbenzyl group, a methoxybenzyl group, a phenethyl group, a 3-phenylpropyl group, a dimethylbenzyl group, a fluorobenzyl group, a 2-methoxyethyl group or a 3-methoxypropyl group).

$T^1$ represents a hydrogen atom or an aliphatic group having from 1 to 6 carbon atoms, which may be substituted (for example, a methyl group, an ethyl group, a propyl group, a butyl group, a 2-chloroethyl group, a 2,2-dichloroethyl group, a 2,2,2-trifluoroethyl group, a 2-bromoethyl group, a 2-hydroxyethyl group, a 2-hydroxypropyl group, a 2,3-dihydroxypropyl group, a 2-hydroxy-3-chloropropyl group, a 2-cyanoethyl group, a 3-cyanopropyl group, a 2-nitroethyl group, a 2-methoxyethyl group, a 2-methanesulfonylethyl group, a 2-ethoxyethyl group, a 3-bromopropyl group, a 4-hydroxybutyl group, a 2-furfurylethyl group, a 2-thienylethyl group, a 2-carboxyethyl group, a 3-carboxypropyl group, a 4-carboxybutyl group, a 2-carboxyamidoethyl group, a 3-sulfonamidopropyl group, a 2-N-methylcarboxyamidoethyl group, a cyclopentyl group, a chlorocyclohexyl group or a dichlorohexyl group).

$c^1$ and $c^2$, which may be the same or different, each preferably represent a hydrogen atom, a halogen atom (for example, a chlorine atom or a bromine atom), a cyano group, an alkyl group having from 1 to 3 carbon atoms (for example, a methyl group, an ethyl group or a propyl group), —COO-Z$^{12}$, or —CH$_2$—COO-Z$^{12}$, wherein Z$^{12}$ represents a hydrogen atom or an hydrocarbon group having not more than 10 carbon atoms, which may be substituted (for example, an alkyl group, an alkenyl group, an aralkyl group or an aryl group).

Specific examples of the monofunctional polymerizable monomer (A) include a vinyl ester or allyl ester of an aliphatic carboxylic acid having from 1 to 6 carbon atoms (for example, acetic acid, propionic acid, butyric acid, monochloroacetic acid or trifluoropropionic acid); an alkyl ester or alkyl amide having from 1 to 32 carbon atoms, which may be substituted, of an unsaturated carboxylic acid (for example, acrylic acid, methacrylic acid, crotonic acid, itaconic acid or maleic acid) (examples of the alkyl group include a methyl group, an ethyl group, a propyl group, a butyl group, a 2-chloroethyl group, a 2-bromoethyl group, a 2-hydroxyethyl group, a 2-cyanoethyl group, a 2-nitroethyl group, a 2-methoxyethyl group, a 2-methanesulfonylethyl group, a 2-benzenesulfonylethyl group, a 2-carboxyethyl group, a 4-carboxybutyl group, a 3-chloropropyl group, a 2-hydroxy-3-chloropropyl group, a 2-furfurylethyl group, a 2-thienylethyl group, a 2-carboxyamidoethyl group, a decyl group, a dodecyl group, a tridecyl group, a tetradecyl group, a hexadecyl group, an octadecyl group, a docosyl group, a dodecenyl group, a hexadecenyl group, an oleyl group, an linoleyl group or a docosenyl group); a styrene derivative (for example, styrene, vinyltoluene, α-methylstyrene, vinylnaphthalene, chlorostyrene, dichlorostyrene, bromostyrene, vinylbenznecarboxylic acid, vinylbenzenesulfonic acid, chloromethylstyrene, hydroxymethylstyrene, methoxymethylstyrene, vinylbenzenecarboxamide or vinylbenzenesulfonamide); an unsaturated carboxylic acid (for example, acrylic acid, methacrylic acid, crotonic acid, maleic acid or itaconic acid); a cyclic acid anhydride of maleic acid or itaconic acid; acrylonitrile; methacrylonitrile; and a polymerizable double bond group-containing heterocyclic compound (specifically, the compounds described in Kobunshi Gakkai ed., *Polymer Data Handbook—Fundamental Edition*—, pages 175 to 184, Baifukan Co., Ltd. (1986), for example, N-vinylpyridine, N-vinylimidazole, N-vinylpyrrolidone, vinylthiophene, vinyltetrahydrofuran, vinyloxazoline, vinylthiazole or N-vinylmorpholine).

The monofunctional polymerizable monomer (A) is preferably selected from those described above.

In the invention, other monomer components that are copolymerizable with the monofunctional polymerizable monomer (A) may be used together.

Examples of the other copolymerizable monomer component include a basic monomer (B) containing an amino group represented by formula: —N(R$^1$) (R$^2$). By using the copolymerizable amino group-containing basic monomer (B) as a copolymerization component together with the monofunctional polymerizable monomer (A) in the colored resin particles of the invention, the surfaces of the particles themselves exhibit positive charges, thereby enhancing dispersion stability of the particles dispersed in the non-aqueous solvent. It is assumed that this is caused by charge repulsion effects generated when the particles come close to each other.

In the above formula, $R^1$ and $R^2$, which may be the same or different, each preferably represent a hydrogen atom, an alkyl group having from 1 to 22 carbon atoms, which may be substituted (for example, a methyl group, an ethyl group, a propyl group, a butyl group, a hexyl group, a heptyl group, an octyl group, a nonyl group, a decyl group, a dodecyl group, a tridecyl group, a tetradecyl group, a hexadecyl group, an octadecyl group, an eicosyl group, a docosyl group, a 2-chloroethyl group, a 2-bromoethyl group, a 2-cyanoethyl group, a 2-methoxycarbonylethyl group, a 2-methoxyethyl group or a 3-bromopropyl group), an alkenyl group having from 4 to 18 carbon atoms, which may be substituted (for example, a 2-methyl-1-propenyl group, a 2-butenyl group, a 2-pentenyl group, a 3-methyl-2-pentenyl group, a 1-pentenyl group, a 1-hexenyl group, a 2-hexenyl group, a 4-methyl-2-hexenyl group, a decenyl group, a dodecenyl group, a tridecenyl group, a hexadecenyl group, an octadecenyl group or a linoleyl group), an aralkyl group having from 7 to 12 carbon atoms, which may be substituted (for example, a benzyl group, a phenethyl group, a 3-phenylpropyl group, a naphthylmethyl group, a 2-naphthylethyl group, a chlorobenzyl group, a bromobenzyl group, a methylbenzyl group, an ethylbenzyl group, a methoxybenzyl group, a dimethylbenzyl group or a dimethoxybenzyl group), an alicyclic group having from 5 to 8 carbon atoms, which may be substituted (for example, a cyclohexyl group, a 2-cyclohexylethyl group or a 2-cyclopentylethyl group), or an aromatic group having from 6 to 12 carbon atoms, which may be substituted (for example, a phenyl group, a naphthyl group, a tolyl group, a xylyl group, a propylphenyl group, abutylphenyl group, an octylphenyl group, a dodecylphenyl group, a methoxyphenyl group, an ethoxyphenyl group, a butoxyphenyl group, a decyloxyphenyl group, a chlorophenyl group, a dichlorophenyl group, a bromophenyl group, a cyanophenyl group, an acetylphenyl group, a methoxycarbonylphenyl group, an ethoxycarbonylphenyl group, a butoxycarbonylphenyl group, an acetamidophenyl group, a propionamidophenyl group or a dodecyloylamidophenyl group).

Further, $R^1$ and $R^2$ may be combined with each other to form a ring, and specifically represent together a ring-forming organic reside that may contain a hetero atom (for example, an oxygen atom, a nitrogen atom or a sulfur atom). Examples of the cyclic amino group formed include a morpholino group, a piperidino group, a pyridinyl group, an imidazolyl group and aquinolyl group. A plurality of the amino groups may be included in a molecule of the basic monomer.

The basic monomer (B) is preferably used in an amount of from 1 to 45% by weight, and more preferably from 3 to 30% by weight based on the total amount of the polymerizable monomer (A).

Specific examples of the basic monomer (B) are set forth below, but the invention should not be construed as being limited thereto. In the following examples, $d^1$ represents —H, —CH$_3$, —Cl or —CN; $p_1$ represents an integer of from 2 to 12; $d^2$ represents —H or —CH$_3$; and $p_2$ represents an integer of from 2 to 4.

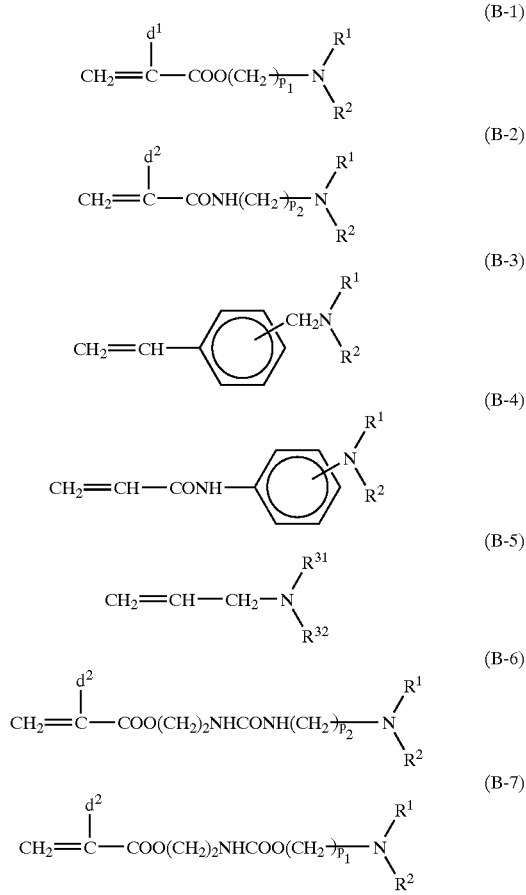

Now, the macromonomer (M) for use in the invention is described in detail below.

The macromonomer (M) for use in the invention is preferably a macromonomer having a weight average molecular weight of from $1\times10^3$ to $4\times10^4$ in which a polymerizable double bond group represented by formula (I) described above is connected to a terminal of the main chain of a polymer comprising a repeating unit represented by formula (II) described above.

In formula (I), V represents —COO—, —OCO—, —(CH$_2$)$_m$—OCO—, —(CH$_2$)$_m$—COO—, —O—, —CONHCOO—, —CONHCO—, —SO$_2$—, —CO—, —CON(Z$^1$)-, —SO$_2$N(Z$^1$)- or a phenylene group (hereinafter, the phenyl group is represented by "-Ph-" and the "-Ph-" includes a 1,2-phenylene group, a 1,3-phenylene group and a 1,4-phenylene group). $Z^1$ represents a hydrogen atom or a hydrocarbon group, and m represents an integer of from 1 to 3.

$a^1$ and $a^2$, which may be the same or different, each represent a hydrogen atom, a halogen atom, a cyano group, a hydrocarbon group, —COO-$Z^2$ or —COO-$Z^2$ linked through a hydrocarbon group, in which $Z^2$ represents a hydrogen atom or a hydrocarbon group which may be substituted.

In formula (II), $X^0$ represents a connecting group selected from —COO—, —OCO—, —(CH$_2$)$_n$—OCO—, —(CH$_2$)$_n$—COO—, —O—, —CONHCOO—, —CONHCO—, —SO$_2$—, —CO—, —CON(Z$^3$)- and —SO$_2$N(Z$^3$)-. $Z^3$ represents a hydrogen atom or a hydrocarbon group, and n represents an integer of from 1 to 3.

$b^1$ and $b^2$, which may be the same or different, each have the same meanings as defined for $a^1$ and $a^2$ of formula (I). $Q^0$ represents an aliphatic group having from 1 to 22 carbon atoms.

The aliphatic group having from 1 to 22 carbon atoms represented by $Q^0$ may have a substituent containing a fluorine atom and/or a silicon atom.

In formula (I), $Z^1$ included in the group represented by V represents a hydrocarbon atom, as well as a hydrogen atom. Preferred examples of the hydrocarbon group include an alkyl group having from 1 to 22 carbon atoms, which may be substituted (for example, a methyl group, an ethyl group, a propyl group, a butyl group, a heptyl group, a hexyl group, an octyl group, a decyl group, a dodecyl group, a tridecyl group, a tetradecyl group, a hexadecyl group, an octadecyl group, a 2-chloroethyl group, a 2-bromoethyl group, a 2-cyanoethyl group, a 2-methoxycarbonylethyl group, a 2-methoxyethyl group or a 2-bromopropyl group), an alkenyl group having from 4 to 18 carbon atoms, which may be substituted (for example, a 2-methyl-1-propenyl group, a 2-butenyl group, a 2-pentenyl group, a 3-methyl-2-pentenyl group, a 1-pentenyl group, a 1-hexenyl group, a 2-hexenyl group or a 4-methyl-2-hexenyl group), an aralkyl group having from 7 to 12 carbon atoms, which may be substituted (for example, a benzyl group, a phenethyl group, a 3-phenylpropyl group, a naphthylmethyl group, a 2-naphthylethyl group, a chlorobenzyl group, a bromobenzyl group, a methylbenzyl group, an ethylbenzyl group, a methoxybenzyl group, a dimethylbenzyl group or a dimethoxybenzyl group), an alicyclic group having from 5 to 8 carbon atoms, which may be substituted (for example, a cyclohexyl group, a 2-cyclohexylethyl group or a 2-cyclopentylethyl group), an aromatic group having from 6 to 12 carbon atoms, which may be substituted (for example, a phenyl group, a naphthyl group, a tolyl group, a xylyl group, a propylphenyl group, a butylphenyl group, an octylphenyl group, a dodecylphenyl group, a methoxyphenyl group, an ethoxyphenyl group, a butoxyphenyl group, a decyloxyphenyl group, a chlorophenyl group, a dichlorophenyl group, a bromophenyl group, a cyanophenyl group, an acetylphenyl group, a methoxycarbonylphenyl group, an ethoxycarbonylphenyl group, a butoxycarbonylphenyl group, an acetamidophenyl group, a propionamidophenyl group or a dodecyloylamidophenyl group), and a group of a bridged hydrocarbon having from 5 to 18 carbon atoms (for example, bicyclo[1.1.0]butane, bicyclo[3.2.1]octane, bicyclo[5.2.0]nonane, bicyclo[4.3.2] undecane or adamantane).

When V represents -Ph-, the benzene ring may have a substituent. Examples of the substituent include a halogen atom (for example, a chlorine atom or a bromine atom) and an alkyl group (for example, a methyl group, an ethyl group, a propyl group, a butyl group, a chloromethyl group or a methoxymethyl group).

$a^1$ and $a^2$, which may be the same or different, each preferably represent a hydrogen atom, a halogen atom (for example, a chlorine atom or a bromine atom), a cyano group, an alkyl group having from 1 to 3 carbon atoms (for example, a methyl group, an ethyl group or a propyl group), —COO-$Z^2$ or —CH$_2$COO-$Z^2$ (wherein $Z^2$ represents a hydrogen atom or an alkyl group having from 1 to 18 carbon atoms, an alkenyl group, an aralkyl group, an alicyclic group or an aryl group, which may be substituted, and specific examples thereof include those described for $Z^1$ described above).

In formula (II), $X^0$ represents a connecting group selected from —COO—, —OCO—, —(CH$_2$)$_n$—OCO—, —(CH$_2$)$_n$—COO—, —O—, —CONHCOO—, —CONHCO—, —SO$_2$—, —CO—, —CON($Z^3$)- and —SO$_2$N ($Z^3$)-. $Z^3$ represents a hydrogen atom or a hydrocarbon group, and specific examples thereof include those described for $Z^1$ described above. n represents an integer of from 1 to 3.

$Q^0$ represents an aliphatic group having from 1 to 22 carbon atoms, and specific examples thereof include those of the alkyl group for $Z^1$ described above.

The aliphatic group having from 1 to 22 carbon atoms represented by $Q^0$ may have a substituent containing a fluorine atom and/or a silicon atom. Examples of the substituent containing a fluorine atom include the following monovalent or divalent organic residues:

—C$_p$(F)$_{2p+1}$ (p represents an integer of from 1 to 22), —CFH$_2$, —CFHCl, —CFCl$_2$, —CF$_2$Cl, —(CF$_2$)$_q$CF$_2$H (q represents 0 or an integer of from 1 to 17), —CF$_2$—, —CFH— and —CFCl—.

The organic residues containing a fluorine atom may be used in combination. In such cases, they may be combined with each other directly or through other connecting group. The connecting group includes a divalent organic residue, for example, a divalent aliphatic residue or divalent aromatic residue that may contain a connecting group selected from —O—, —S—, —N(g$^1$)-, —CO—, —SO—, —SO$_2$—, —COO—, —OCO—, —CONHCO—, —NHCONH—, —CON(g$^1$)- and —SO$_2$N(g$^1$)- and an organic group composed of a combination of these divalent groups. g$^1$ represents an alkyl group having from 1 to 3 carbon atoms.

Examples of the substituent containing a silicon atom preferably include a residue containing a siloxane-structure (or a silyloxy structure) or a silyl group.

$b^1$ and $b^2$, which may be the same or different, each have the same meanings as defined for $a^1$ and $a^2$ of formula (I) described above. Preferred examples of $b^1$ and $b^2$ are also same as those described for $a^1$ and $a^2$ above.

More preferred group for $a^1$ or $a^2$ of formula (I) and $b^1$ or $b^2$ of formula (II) is a hydrogen atom or a methyl group.

It is desirable that the polymer having the repeating unit represented by formula (II) can solvate with the non-aqueous dispersing medium in view of dispersion stability of the colored resin particles. From this point of view, $Q^0$ preferably represents an aliphatic group having from 6 to 22 carbon atoms. Preferred examples of the polymer having the repeating unit represented by formula (II) include polyhexyl acrylate, polyhexyl methacrylate, polylauryl acrylate, polylauryl methacrylate, polystearyl acrylate, polystearyl methacrylate, poly-2-ethylhexyl acrylate, poly-2-ethylhexyl methacrylate and polycetyl methacrylate, but the invention should not be construed as being limited thereto.

Specific examples of the repeating unit represented by formula (II) wherein $Q^0$ represents an aliphatic group having from 1 to 22 carbon atoms, which includes a substituent containing a fluorine atom and/or a silicon atom, are set forth below, but the invention should not be construed as being limited thereto.

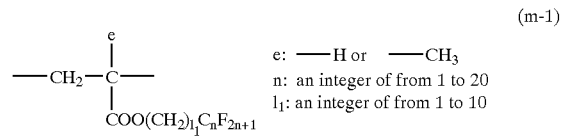

(m-1)

e: —H or —CH$_3$
n: an integer of from 1 to 20
l$_1$: an integer of from 1 to 10

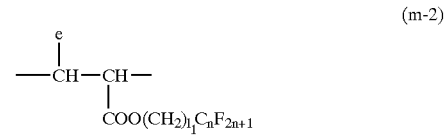

(m-2)

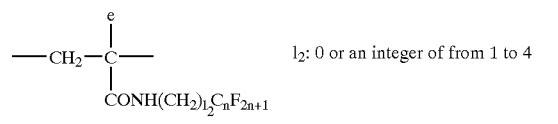

(m-3)

l$_2$: 0 or an integer of from 1 to 4

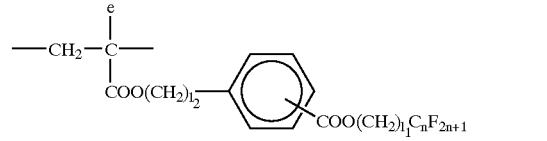

(m-4)

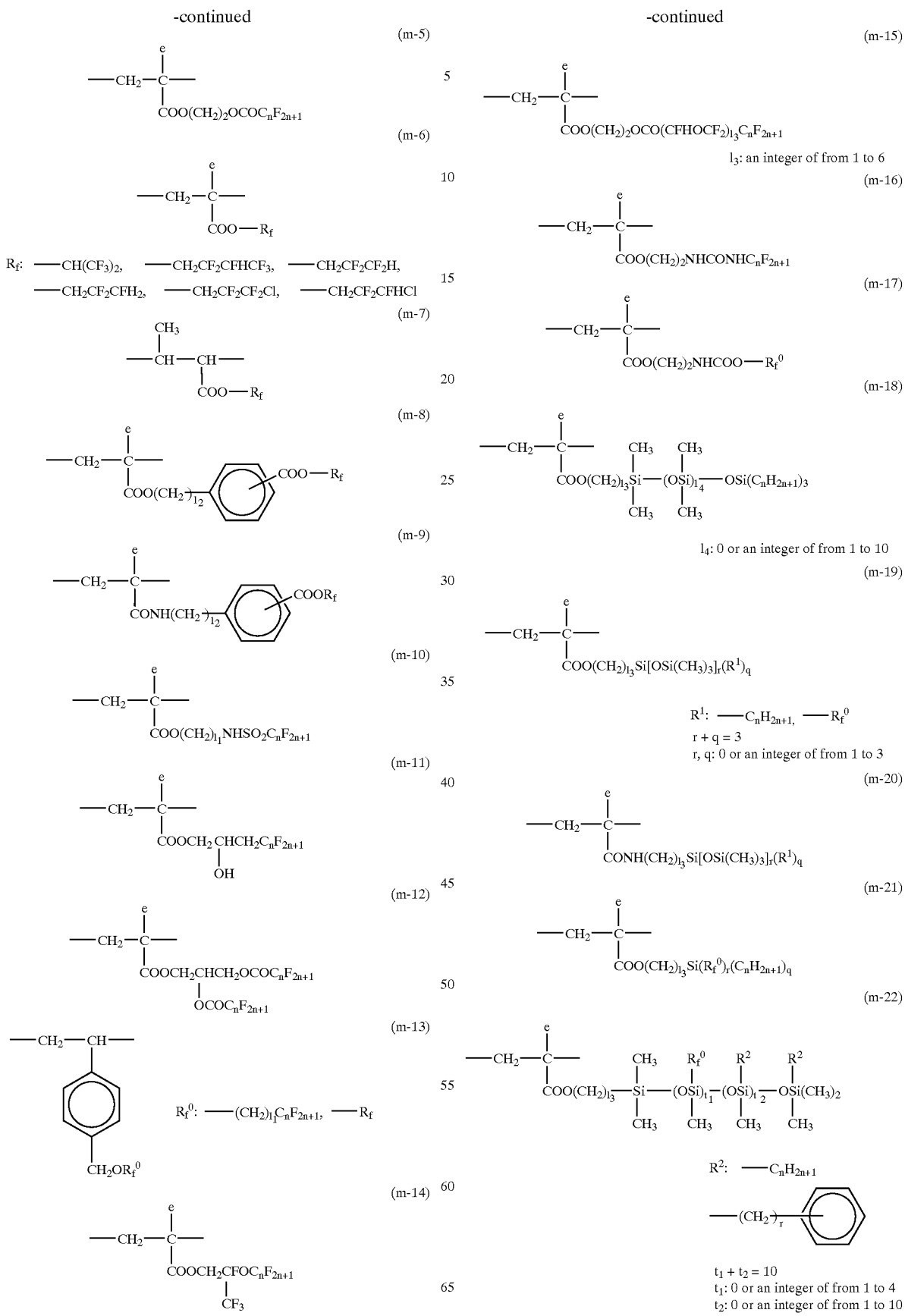

-continued (m-23)
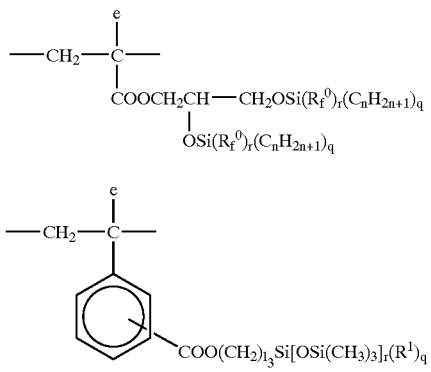

(m-24)
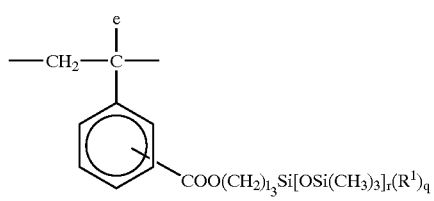

Of the macromonomers (M) according to the invention, those represented by the following formula (IV) are preferred.

(IV)
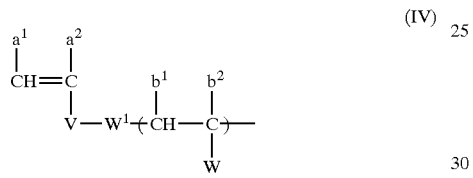

In formula (IV), $a^1$, $a^2$, $b^1$, $b^2$ and V have the same meanings as defined for those in the formulae (I) and (II), respectively.

W represents $—X^0-Q^0$ in formula (II) and $X^0$ and $Q^0$ each have the meanings as defined in formula (II).

$W^1$ represents a single bond, an individual connecting group selected from $—C(Z^6)(Z^7)-$ (wherein $Z^6$ and $Z^7$ each represent a hydrogen atom, a halogen atom (for example, a fluorine atom, a chlorine atom or a bromine atom), a cyano group or a hydroxy group), $—(CH=CH)—$, a cyclohexylene group (hereinafter, the cyclohexylene group is represented by "-Cy-" and the "-Cy-" includes a 1,2-cyclohexylene group, a 1,3-cyclohexylene group and a 1,4-cyclohexylene group), -Ph-, —O—, —S—, —C(=O)—, —N ($Z^8$)-, —COO—, —SO—, —CON($Z^8$)-, —SON($Z^8$)-, —NHCOO—, —NHCONH— and —Si($Z^8$)($Z^9$)- (wherein $Z^8$ and $Z^9$ each represent a hydrogen atom or a hydrocarbon group having the same meaning as defined for $Z^1$ described above), or a connecting group constituted by an appropriate combination of two or more thereof.

In the formulae (I), (II) and (IV), particularly preferred examples of $X^0$, V, $a^1$, $a^2$, $b^1$ and $b^2$ are shown below, respectively.

$X^0$ includes one or more connecting groups selected from —COO—, —OCO—, —O—, —CH$_2$COO— and —CH$_2$OCO—; V includes all the groups described above (provided that $Z^1$ represents a hydrogen atom); and $a^1$, $a^2$, $b^1$ and $b^2$ include a hydrogen atom and a methyl group, respectively.

Specific examples of the moiety represented by CH($a^1$)=C($a^2$)-V-$W^1$- in the macromonomer of formula (IV) are set forth below, but the invention should not be construed as being limited thereto.

In the following examples, j represents an integer of from 1 to 12, k represents an integer of from 2 to 12, and a represents —H or —CH$_3$.

(iv-1)
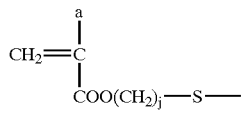

(iv-2)
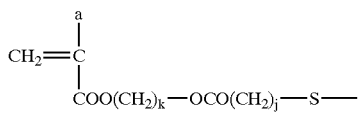

(iv-3)
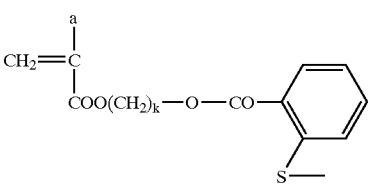

(iv-4)
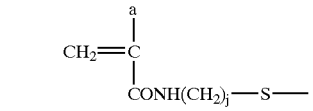

(iv-5)
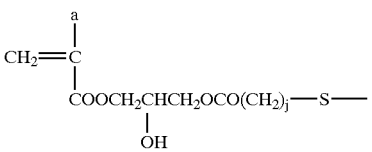

(iv-6)
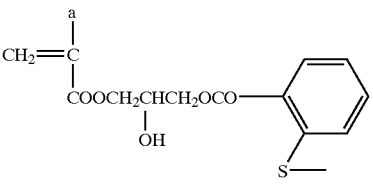

(iv-7)
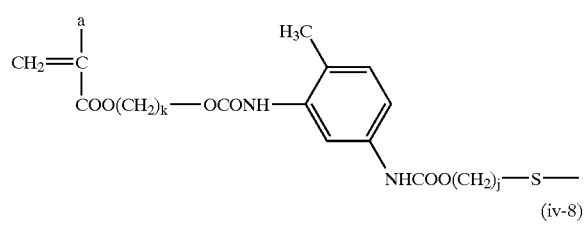

(iv-8)
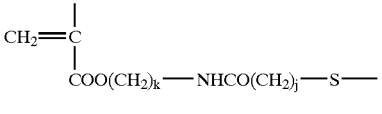

(iv-9)
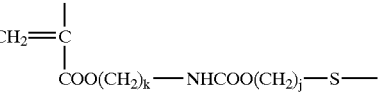

(iv-10)
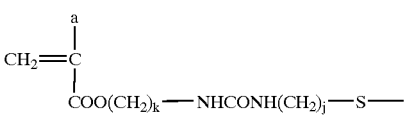

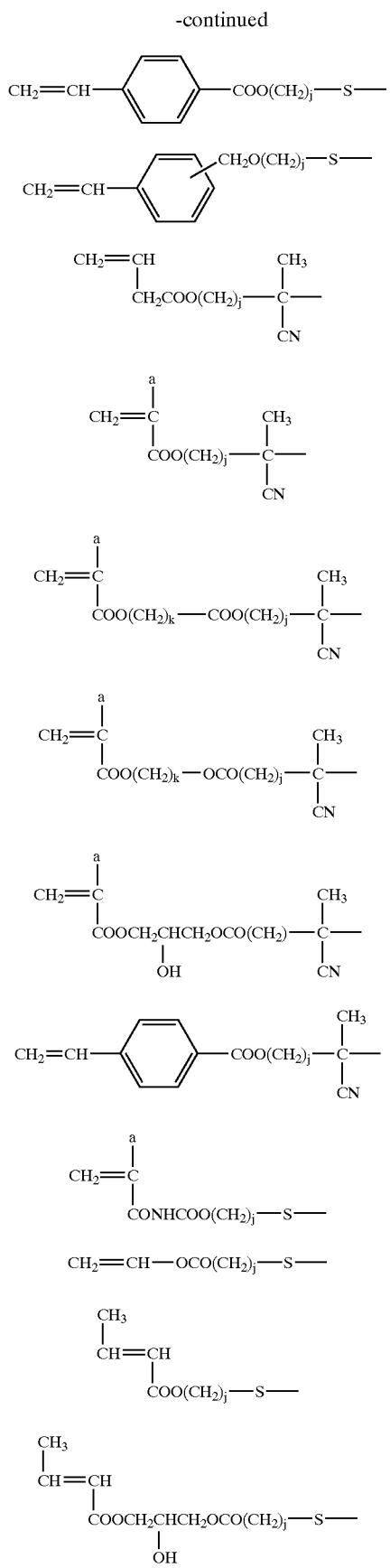
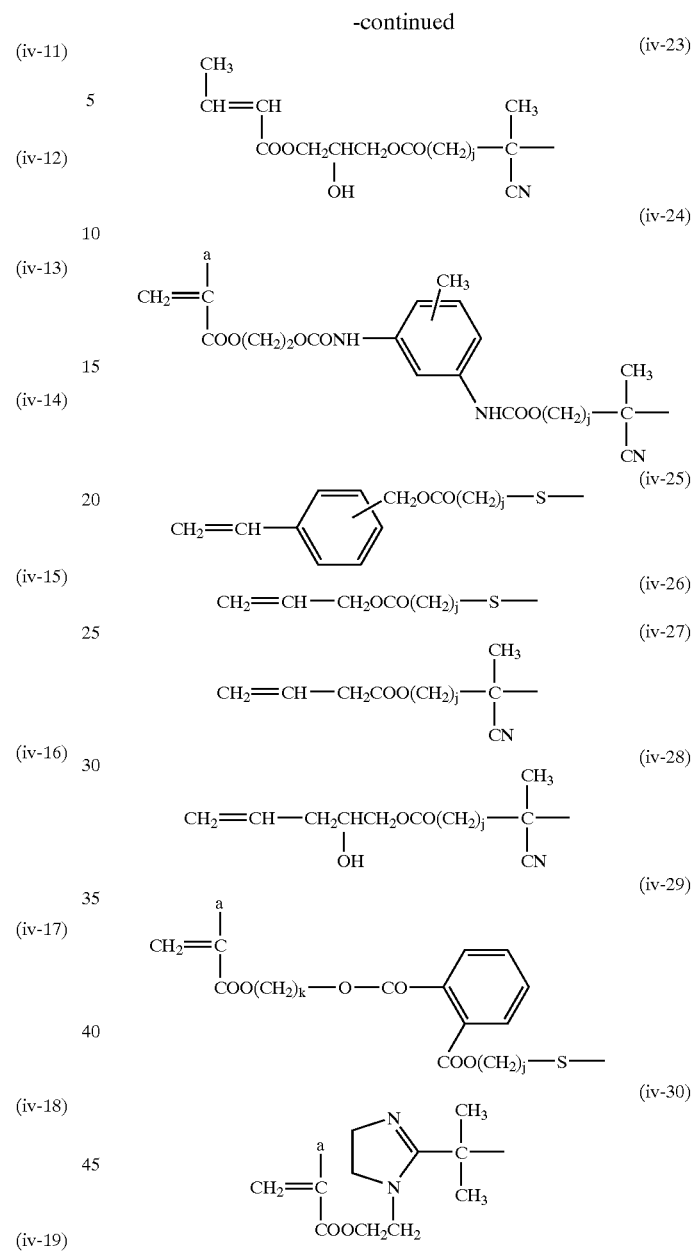

The macromonomer (M) of the invention can be produced by conventionally known synthesis methods. Examples thereof include (1) a method using ionic polymerization in which various reagents are reacted with a terminal of a living polymer obtained by anionic polymerization or cationic polymerization to form a macromonomer; (2) a method using radical polymerization in which various reagents are reacted with an oligomer having a terminal reactive group obtained by radical polymerization using a polymerization initiator and/or chain transfer agent containing a reactive group, for example, a carboxy group, a hydroxy group or an amino group in the molecule thereof, thereby forming a macromonomer; and (3) a method using polyaddition condensation in which a polymerizable double bond group is introduced into an oligomer obtained by a polyaddition or polycondensation reaction, in the same manner as in the above-described radical polymerization method.

Specifically, the macromonomer can be synthesized according to methods described, for example, in P. Dreyfuss and R. P. Quirk, *Encycl. Polym. Sci. Eng.*, Vol. 7, page 551 (1987), P. F. Rempp and E. Franta, *Adv. Polym. Sci.*, Vol. 58, page 1 (1984), V. Percec, *Appl. Polym. Sci.*, Vol. 285, page 95 (1984), R. Asami and M. Takagi, *Makromol. Chem. Suppl.*, Vol. 12, page 163 (1985), P. Rempp et al., *Makromol. Chem. Suppl.*, Vol. 8, page 3 (1987), Yusuke Kawakami, *Kagaku Kogyo*, Vol. 38, page 56 (1987), Tatsuya Yamashita, *Kobunshi*, Vol. 31, page 988 (1982), Shiro Kobayashi, *Kobunshi*, Vol. 30, page 625 (1981), Toshinobu Higashimura, *Nippon Setchaku Kyokaishi*, Vol. 18, page 536 (1982), Koichi Ito, *Kobunshi Kako*, Vol. 35, page 262 (1986), and Takashiro Azuma and Takashi Tsuda, *Kino Zairyo*, Vol. 1987, No. 10, page 5, and the literature references and patents cited therein.

The resin insoluble in the non-aqueous solvent, which constitutes a shell layer of the colored resin particle for use in the ink composition of the invention, has preferably a glass transition point ranging from 0 to 80° C. or a softening point ranging from 40 to 100° C., and more preferably a glass transition point ranging from 10 to 70° C. or a softening point ranging from 45 to 80° C. The monomer (A) and the macromonomer (M), and if desired, the monomer (B) can be appropriately selected so as to form a polymer exhibiting such thermal properties.

In order to prepare a stable resin dispersion of polymer particles that are formed by polymerization of the monomers in a non-aqueous solvent and insoluble in the non-aqueous solvent, the polymerization is performed in the presence of a dispersion stabilizer (P) in the invention.

Now, the dispersion stabilizer (P) is described in detail below.

It is preferred that the dispersion stabilizer (P) has a segment that solvates with the non-aqueous solvent and a segment that hardly solvates with the non-aqueous solvent and is liable to associate with or adsorb on the resin particles formed by the polymerization. The dispersion stabilizers (P) are described in detail, for example, in K. J. Barrett, *Dispersion Polymerization in Organic Media*, Chapter 3, "The Design and Synthesis of Dispersants for Dispersion Polymerization in Organic Media", John Willy & Sons. Examples of the monomer that solvates with the solvent include lauryl methacrylate, stearyl methacrylate, 2-ethylhexyl methacrylate and cetyl methacrylate. Examples of the monomer that hardly solvates with the solvent and is liable to adsorb on the resin particles after the polymerization include methyl methacrylate, ethyl methacrylate, isopropyl methacrylate, styrene and vinyltoluene.

Further, various known amphipathic resins that are used in liquid developers can be used as the dispersion stabilizer (P). Specific examples thereof include the graft copolymer type dispersion stabilizers (P) as described in JP-A-4-350669 and JP-A-5-188657, the block copolymer type dispersion stabilizers (P) as described in JP-A-6-95436, non-aqueous solvent-soluble random copolymer type dispersion stabilizers (P) containing graft groups as described in JP-A-1-43638, the partially crosslinked polymer type dispersion stabilizers (P) as described in JP-A-10-316917, and the partially crosslinked polymer type dispersion stabilizers (P) containing a graft group at the terminal of the main chain thereof as described in JP-A-10-316920. However, the dispersion stabilizer (P) should not be construed as being limited thereto.

Preferred examples of the dispersion stabilizer (P) include the graft copolymers shown below as described in JP-A-4-350669 and JP-A-5-188657. Specifically, graft copolymers comprising at least one macromonomer (MM) having a weight average molecular weight of from $1 \times 10^3$ to $1 \times 10^5$, which has a polymerizable double bond group represented by formula (VI) shown below connected to the terminal of the main chain of a polymer containing at least one polymer component represented by formula (Va) or (Vb) shown below, and at least one monomer represented by formula (VII) shown below are preferred.

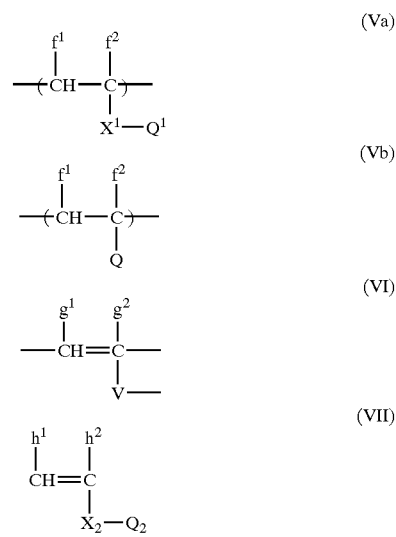

In formula (Va), $f^1$, $f^2$, $X^1$ and $Q^1$ have the same meanings as defined for $b^1$, $b^2$, $X^0$ and $Q^0$ in formula (II) described above, respectively.

In formula (Vb), Q represents —CN or an unsubstituted or substituted phenyl group. Examples of the substituent include a halogen atom, an alkoxy group or —COOZ$^4$ (wherein Z$^4$ represents an alkyl group, an aralkyl group or an aryl group). $f^1$ and $f^2$ have the same meanings as defined for $b^1$ and $b^2$ in formula (II) described above, respectively.

In formula (VI), V has the same meaning as defined for V in formula (I). $g^1$ and $g^2$, which may be the same or different, each have the same meanings as defined for $b^1$ and $b^2$ in formula (II) described above, respectively.

In formula (VII), $X^2$ has the same meaning as defined for $V^1$ in formula (III). $Q^2$ represents a hydrogen atom, an aliphatic group having from 1 to 22 carbon atoms or an aromatic group having from 6 to 12 carbon atoms. $h^1$ and $h^2$, which may be the same or different, each have the same meanings as defined for $a^1$ and $a^2$ in formula (I).

However, in the case where the graft copolymer comprises the polymer component represented by formula (Va) and the monomer represented by formula (VII), at least one of $Q^1$ and $Q^2$ represents an aliphatic group having from 4 to 22 carbon atoms. Further, in the case where the graft copolymer comprises the polymer component represented by formula (Vb) and the monomer represented by formula (VII), $Q^2$ represents an aliphatic group having from 4 to 22 carbon atoms.

Specific preferred examples of the macromonomer (MM) for use in the graft copolymer type dispersion stabilizer (P) include the specific preferred examples described above for the macromonomer (M) copolymerizable with the monomer (A).

For the preparation of the colored resin particles having a coloring agent included therein for use in the invention, a method is employed wherein a polymerization system comprising the monofunctional polymerizable monomer (A), the macromonomer (M) and the dispersion stabilizer (P) added to a non-aqueous solvent containing seed particles (coloring component fine particles) prepared by finely dispersing the surface-treated coloring agent (coloring component) is polymerized in the presence of a polymerization initiator, for example, benzoyl peroxide, azobis(2,4-dimethylvaleronitrile), azobis(4-methoxy-2,4-dimethylvaleronitrile), azobisisobutyronitrile or butyllithium can be employed.

Specifically, in order to add the polymerizable monomers (including the monomer (A), the macromonomer (M) and optionally the monomer (B)), the dispersion stabilizer (P) and the polymerization initiator to the non-aqueous solvent containing the seed particles prepared by finely dispersing the surface treated coloring agent, there are various methods including, for example, the following methods:

(1) A method in which a solution prepared by mixing and dissolving the polymerizable monomers, the dispersion stabilizer (P) and the polymerization initiator in the non-aqueous solvent is added dropwise, collectively or dividedly to a non-aqueous solvent containing the seed particles prepared by finely dispersing the coloring component.

(2) A method in which a solution containing the dispersion stabilizer (P) dissolved therein is added to the non-aqueous solvent containing the seed particles prepared by finely dispersing the coloring component, then are added thereto dropwise, collectively or dividedly the polymerizable monomers and the polymerization initiator.

(3) A method in which a part of a solution prepared by mixing and dissolving the polymerizable monomers, the dispersion stabilizer (P) and the polymerization initiator in the non-aqueous solvent is added to the non-aqueous solvent containing the seed particles prepared by finely dispersing the coloring component to conduct dispersion polymerization, and then the remaining mixture of the polymerizable monomers, the dispersion stabilizer (P) and the polymerization initiator is then appropriately added.

(4) A method in which a part of the polymerizable monomers is added to the non-aqueous solvent containing seed particles prepared by finely dispersing the coloring component to promote absorption of the polymerizable monomers on the seed particles, and then the remaining polymerizable monomers, the dispersion stabilizer (P) and the polymerization initiator are added dropwise, collectively or dividedly.

A proportion of the seed particle (coloring component fine particle) to the total amount of the polymerizable monomers (including monomer (A), macromonomer (M) and optionally, monomer (B)) is preferably from 5/95 to 95/5 by weight, and more preferably from 10/90 to 80/20 by weight. An amount of the total polymerizable monomers used is from about 5 to 80 parts by weight, and preferably from 10 to 50 parts by weight based on 100 parts by weight of the non-aqueous solvent. An amount of the soluble dispersion stabilizer (P) is from 1 to 100 parts by weight, and preferably from 3 to 50 parts by weight based on 100 parts by weight of the total monomers. An amount of the polymerization initiator is suitably from 0.1 to 5% by mole based on the total monomers. Moreover, the polymerization temperature is approximately from 20 to 180° C., and preferably from 30 to 120° C. The reaction time is preferably from 1 to 15 hours.

In the case where an aromatic hydrocarbon, for example, toluene or xylene remains in the non-aqueous solvent used for the reaction, in the case where the above-described polar solvent, for example, alcohol, ketone, ether or ester is used together, or in the case where the monomer to be subjected to granulation polymerization remains unreacted, it is preferred to remove such a material by distillation with heating over a boiling point of such a material or vacuum distillation.

The thus prepared non-aqueous dispersion of colored resin particles having a coloring agent included therein is excellent in that the coloring agent is uniformly dispersed in the state of fine particle and in its dispersion stability do that it can provide an oil based ink for inkjet printer, which is free from clogging in a nozzle section and has high discharge stability. Further, the resulting ink is excellent in drying property on recording paper and water resistance and light fastness of recorded images, and has high-level scratch resistance. In addition, it is possible to easily obtain colored resin particles containing a coloring agent included therein uniformly dispersed in the state of fine particles in the non-aqueous solvent. Accordingly, the invention provides an oil based ink for inkjet printer excellent in control of charge polarity and stability of charge with the lapse of time, and an inexpensive production process thereof. Further, the invention is characterized in that a function, for example, fixing property or charge property can be imparted to the colored resin particles containing a coloring agent included therein by appropriately selecting the polymerizable monomer.

In the following embodiments, usefulness of the ink composition of the invention will be described using an oil based ink for inkjet printer. As the inkjet printer, a printer of piezoelectric system or a printer of electrostatic system is employed by way of illustration. However, it should be noted that the invention is not limited to such a system, and can also be applied to inkjet printers of thermal system and slit jet system as represented by NTT.

An inkjet printer of electrostatic system is described in detail below.

Figure 2:
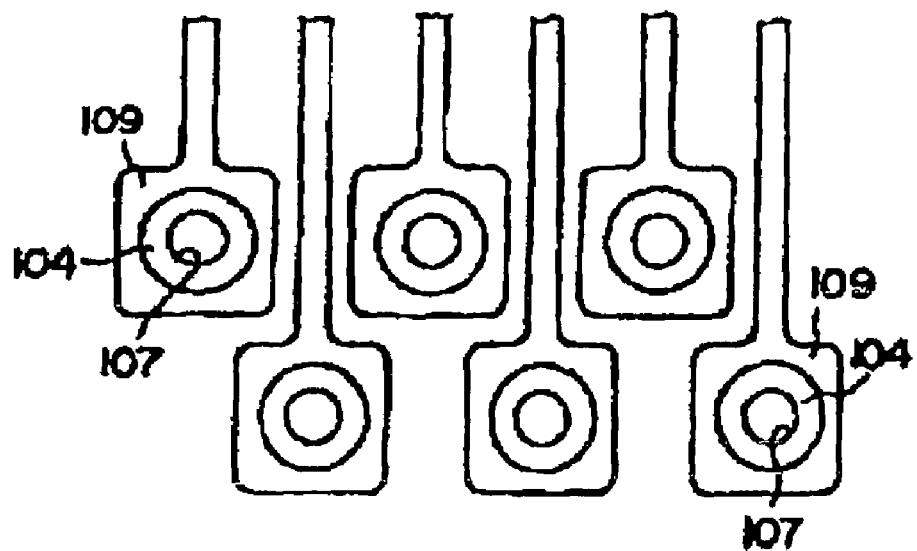
FIG. 2 is a front view showing a construction of ejection electrode plates of a line scanning type multi-channel inkjet head.

FIGS. 1 and 2 are schematic views showing an embodiment of a discharge head. FIG. 1 is a view of an inkjet head and particularly shows a cross-section of an ejection electrode corresponding to a recording dot. In FIG. 1, ink 100 is supplied between a head plate 102 and an ejection electrode plate 103 through an ink supply passage 112 connected to a head block 101 from a circulation mechanism 111 including a pump and recovered in the ink circulation mechanism 111 through an ink recovery passage 113 formed in the head block 101. The ejection electrode plate 103 is constructed of an insulating plate 104 having a through-hole 107 and an ejection electrode 109 formed around the through-hole 107 toward a recording medium. On the other hand, a convex ink guide 108 is disposed approximately in the center of the through-hole 107 on the head plate 102. The convex ink guide 108 is made of an insulating member, for example, a plastic resin or ceramics. Each convex ink guide is disposed at the line spacing and pitch so that the center thereof corresponds to the center of each through-hole 107, and kept on the head plate 102 by the prescribed method. Each convex ink guide 108 has a shape such that a tip of flat plate having a constant thickness is cut out into a triangular or trapezoidal shape, and the tip section thereof forms an ink droplet ejecting position 110. Each convex ink guide 108 may form a slit-like groove from its tip section, and ink supply into the ink ejecting position 110 is smoothly conducted by capillarity of the slit, thereby enabling to enhance the recording frequency. Further, an appropriate surface of the ink guide may have conductivity, if desired. In this case, by making the conductive portion in an electrically floating state, it is possible to effectively form an electrical field at the ink ejecting position by applying a low voltage to the ejection electrode. Each convex ink guide 108 protrudes approximately vertically from the corresponding through-hole by a prescribed distance in the direction of ink droplet ejection. A recording medium 121, for example, recording paper is placed toward the tip of the convex ink guide 108, and a counter electrode 122 functioning also as a role of a platen guiding the recording medium 121 is disposed on the back surface of the recording medium 121 in relation to the head plate 102. Also, a migration electrode 140 is formed in the bottom portion of a space formed by the head plate 102 and the ejection electrode plate 103. By applying a prescribed voltage to the migration electrode 140, the charged particles in the ink are subjected to electrophoresis in the direction of ejecting position in the ink guide, thereby enabling to enhance responsibility of ejection.

A specific constructional embodiment of the ejection electrode plate 103 in a line scanning type multi-channel inkjet head is described with reference to FIG. 2. FIG. 2 is a view of the ejection electrode plate seeing from the side of the recording medium 121, in which a plurality of ejection electrodes are aligned in two lines in an array form in the main scanning direction, the through-hole 107 is formed in the center of each ejection electrode, and the individual ejection electrode 109 is formed around the through-hole 107. In this embodiment, the inner diameter of the ejection electrode 109 is larger than the diameter of the through-hole 107, but it may be equal to the diameter of the through-hole 107. The insulating plate 104 is made of polyimide having a thickness of from about 25 to 200 μm, the ejection electrode 109 is made of a copper foil having a thickness of from about 10 to 100 μm, and the inner diameter of the though-hole 107 is from about 50 to 250 μm.

Recording action of an inkjet recording device of electrostatic system is described below. An embodiment where positively charged ink is used is described, but the invention should not be construed as being limited thereto. At the time of recording, the ink 100 supplied from the ink circulation mechanism 111 through the ink supply passage 112 is supplied into the ink ejecting position 110 of the tip of the convex ink guide 108 through the through-hole 107, and a part of the ink 100 is recovered in the ink circulation mechanism 11 through the ink recovery passage 113. A voltage of, e.g., +1.5 kV as a continuous bias is applied to the ejection electrode from a bias voltage source 123, and when turning on, a pulse voltage of, e.g., +500 V as a signal voltage corresponding to an image signal from a signal voltage source 124 is superimposed to the ejection electrode 109. Further, during this period of time, a voltage of +1.8 kV is applied to the migration electrode 140. On the other hand, the counter electrode 122 provided on the back side of the recording medium 121 is set up at a ground voltage of 0 V as shown in FIG. 1. If desired, the side of the recording medium 121 may be charged, for example, at −1.5 kV, for applying a bias voltage. In such a case, an insulating layer is provided on the surface of the counter electrode 122, the recording medium is charged by a corona discharger, a scorotron charger, a solid ion generator, etc., the ejection electrode 109 is, for example, grounded, and when turning on, a pulse voltage of, e.g., +500 V as a signal voltage corresponding to an image signal from the signal voltage source 124 is superimposed to the ejection electrode 109. Further, during this period of time, a voltage of +200 V is applied to the migration electrode 140. When the ejection electrode 109 is in the turn-on state (in the state where 500 V is applied), and a voltage of 2 kV in total (the pulse voltage of 500 V is superimposed to the bias voltage of 1.5 kV) is applied, an ink droplet 115 is ejected from the ink ejecting position 110 of the tip of the convex electrode 108, drawn in the direction of the counter electrode 122, and reaches the recording medium 121 to form an image.

For precisely controlling flight of the ink droplet after ejection to enhance dot placement accuracy on the recording medium, there are often taken measures, for example, provision of an intermediate electrode between the ejection electrode and the recording medium and provision of a guard electrode for suppressing electric field interference between the ejection electrodes. In this embodiment, as a matter of course, such measures are suitably employed, if desired. Further, a porous body may be provided between the head plate 102 and the ejection electrode plate 103. In this case, not only influence by a change of ink inner pressure due to movement of the inkjet head, etc. can be prevented, but also ink supply into the through-hole 107 after ejection of the ink droplet can be rapidly achieved. Accordingly, ejection of the ink droplet 115 is stabilized, whereby a good image having a uniform density can be recorded at a high speed on the recording medium 121.

The invention will be described in more detail below with reference to the following examples, but the invention should not be construed as being limited thereto.

Preparation examples of the macromonomer (M) according to the invention are described below.

PREPARATION EXAMPLE 1 OF MACROMONOMER

Macromonomer (M-1)

A mixed solution of 100 g of octadecyl methacrylate, 2 g of thioglycolic acid and 200 g of toluene was heated to a temperature of 75° C. with stirring under a nitrogen gas stream. To the solution was added 1.5 g of 2,2'-azobis (isobutyronitrile) (abbreviated as AIBN), followed by reacting for 4 hours. Then, 0.5 g of AIBN was added thereto, followed by reacting for 3 hours, and further 0.3 g of AIBN was added thereto, followed by reacting for 3 hours. The reaction solution was cooled to room temperature, and 2.8 g of 2-hydoxyethyl methacrylate was added thereto. A mixed solution of 4.5 g of dicyclohexylcarbodiimide (abbreviated as DCC) and 10 g of methylene chloride was added dropwise thereto over a period of one hour. Then, 0.1 g of 4-dimethylaminopyridine and 0.1 g of tert-butylhydroquinone were added to the reaction solution, followed by stirring for 4 hours.

The crystals deposited were removed by filtration, and the filtrate was reprecipitated in 2 liters of methanol. The resulting white solid was collected by decantation, dissolved in 300 ml of tetrahydrofuran, and reprecipitated again in 3 liters of methanol. The resulting white powder was collected by decantation and dried under a reduced pressure to obtain Macromonomer (M-1) having a weight average molecular weight of 12,100 in a yield of 93.2 g. The weight average molecular weight (Mw) was measured by a GPC method and calculated in terms of polystyrene (hereinafter the same).

Macromonomer (M-1)

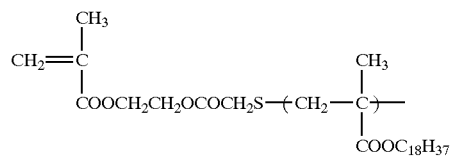

PREPARATION EXAMPLES 2 TO 17 OF MACROMONOMER

Macromonomers (M-2) to (M-17)

Macromonomers (M-2) to (M-17) shown in Tables A and B below were prepared in the same manner as in Preparation Example 1 of Macromonomer except that a methacrylate monomer (corresponding to octadecyl methacrylate), a chain transfer agent (corresponding to thioglycolic acid), an initiator (corresponding to AIBN) and an unsaturated carboxylic acid ester (corresponding to 2-hydoxyethyl methacrylate) were changed to the corresponding compounds, respectively. The weight average molecular weight of each macromonomer obtained was in a range of from 4,600 to 31,000.

TABLE A

| Preparation Example of Macromonomer | Macromonomer (Weight Average Molecular Weight) | Chemical Structure of Macromonomer |
|---|---|---|
| 2 | M-2 (Mw = 12,600) | (structure shown) |
| 3 | M-3 (Mw = 11,800) | (structure shown) |
| 4 | M-4 (Mw = 16,500) | (structure shown) |
| 5 | M-5 (Mw = 4,600) | (structure shown) |
| 6 | M-6 (Mw = 9,800) | (structure shown) |
| 7 | M-7 (Mw = 13,000) | (structure shown) |
| 8 | M-8 (Mw = 14,400) | (structure shown) |

TABLE A-continued

| Preparation Example of Macromonomer | Macromonomer (Weight Average Molecular Weight) | Chemical Structure of Macromonomer |
|---|---|---|
| 9 | M-9 (Mw = 28,300) | $CH_2{=}C(CH_3){-}CONH{-}(CH_2)_{10}{-}COOCH_2CH_2S{-}[CH_2{-}C(CH_3)(COOC_4H_9)]{-}$ |
| 10 | M-10 (Mw = 21,400) | $CH_2{=}C(CH_3){-}COOCH_2CH_2OOC{-}CH_2{-}S{-}[CH_2{-}C(CH_3)(COOC_{18}H_{37})]{-}$ |

TABLE B $$CH_2{=}C(CH_3){-}COOCH_2CH(OH)CH_2OOC{-}(CH_2)_2{-}S{-}(X){-}$$

| Preparation Example of Macromonomer (M) | Macromonomer (M) | —X— |
|---|---|---|
| 11 | M-11 | $-CH_2-C(CH_3)(COOCH_2CF_2CF_2CF_2H)-$ |
| 12 | M-12 | $-CH_2-C(CH_3)(COOCH(CF_3)_2)-$ |
| 13 | M-13 | $-CH_2-C(CH_3)(OCOC_3F_7)(COOCH_2CHCH_2\ OCOC_3F_7)-$ |
| 14 | M-14 | $-CH_2-C(CH_3)(COO(CH_2)_3SiOSi(CH_3)_3\ CH_3\ CH_3)-$ |
| 15 | M-15 | $-CH_2-C(CH_3)(COO(CH_2)_3Si(Y)_3)-$, Y: $-OSi(CH_3)_3$ |
| 16 | M-16 | $-CH_2-C(CH_3)(COOCH_2CHCH_2OSi(CH_3)_3\ OSi(CH_3)_3)-$ |
| 17 | M-17 | $-CH_2-C(CH_3)(COO(CH_2)_3Si\ O\ SiOSi(CH_3)_3\ CH_3\ CH_2CF_3\ CH_3\ CH_3)-$ |

Specific examples of the dispersion stabilizer (P) of graft copolymer type for use in the invention are set forth below, but the invention should not be construed as being limited thereto.

Dispersion Stabilizer (P-1)

Styrene/Macromonomer (M-1)=50/50 (wt/wt)

Weight average molecular weight: 43,000

TABLE C $$\left[-(CH_2-CH)_{\overline{50}}(CH_2-\underset{\underset{COOCH_2CH_2-OCOCH_2S}{|}}{\overset{\overset{CH_3}{|}}{C}})_{\overline{50}}-\right]-(CH_2-\underset{\underset{COOC_{18}H_{37}}{|}}{\overset{\overset{CH_3}{|}}{C}})-$$

| Specific Example of Dispersion Stabilizer | Monomer (Corresponding to Styrene) | Macromonomer | Monomer/ Macro-monomer (wt/wt) | Weight Average Molecular Weight of Dispersion Stabilizer (×10$^4$) |
|---|---|---|---|---|
| P-2 | Styrene | M-1 | 30/70 | 2.8 |
| P-3 | Styrene | M-1 | 70/30 | 3.8 |
| P-4 | Styrene | M-2 | 30/70 | 3.9 |
| P-5 | Styrene | M-2 | 50/50 | 4.0 |
| P-6 | Styrene | M-3 | 50/50 | 4.6 |
| P-7 | Styrene | M-4 | 30/70 | 10.1 |
| P-8 | Styrene | M-6 | 50/50 | 8.2 |
| P-9 | Styrene | M-8 | 10/90 | 3.3 |
| P-10 | MMA | M-1 | 30/70 | 5.5 |
| P-11 | MMA | M-1 | 10/90 | 4.7 |
| P-12 | MMA | M-2 | 20/80 | 5.0 |
| P-13 | MMA | M-7 | 30/70 | 5.6 |
| P-14 | Styrene | M-10 | 50/50 | 3.6 |
| P-15 | Styrene | M-10 | 70/30 | 3.2 |

* MMA: Methyl methacrylate

TABLE D

| Specific Example of Dispersion Stabilizer | Monomer | Macromonomer | Monomer/Macro-monomer (wt/wt) |
|---|---|---|---|
| P-16 | SMA | AS-6 | 80/20 |
| P-17 | LMA | AS-6 | 50/50 |
| P-18 | 2EHMA | AS-6 | 70/30 |
| P-19 | 2EHMA | AS-6 | 50/50 |
| P-20 | SMA | AA-6 | 90/10 |
| P-21 | 2EHMA | AA-6 | 90/10 |
| P-22 | BMA | AA-6 | 70/30 |
| P-23 | SMA | AA-2 | 90/10 |
| P-24 | 2EHMA | AA-2 | 90/10 |
| P-25 | 2EHMA | AA-2 | 80/20 |

*SMA: Stearyl methacrylate
LMA: Lauryl methacrylate
2EHMA: 2-Ethylhexyl methacrylate
BMA: Butyl methacrylate
AS-6, AA-6 and AA-2 are each a methacryloyl group-terminated macromonomer manufactured by Toagosei Co., Ltd. AS-6 is a styrene based macromonomer (number average molecular weight: 6,000), and AA-6 and AA-2 are methyl methacrylate based macromonomers having number average molecular weights of 6,000 and 2,000, respectively.

SMA: Stearyl methacrylate

LMA: Lauryl methacrylate

2EHMA: 2-Ethylhexyl methacrylate

BMA: Butyl methacrylate

AS-6, AA-6 and AA-2 are each a methacryloyl group-terminated macromonomer manufactured by Toagosei Co., Ltd. AS-6 is a styrene based macromonomer (number average molecular weight: 6,000), and AA-6 and AA-2 are methyl methacrylate based macromonomers having number average molecular weights of 6,000 and 2,000, respectively.

The dispersion stabilizers shown in Table D each had a weight average molecular weight of from about 40,000 to 80,000.

EXAMPLE 1

<Preparation of Pigment Dispersion>

A 20% solution prepared by dissolving Dispersion Stabilizer (P-1) described above in Isopar H by heating was used as a pigment dispersant. A mixture of 88.25 parts by weight of the pigment dispersant solution, 17.65 parts by weight of rosin ester resin-treated Microlith Black C-T (manufactured by Ciba Specialty Chemicals) as a black processed pigment and 29.4 parts by weight of Isopar H was blended together with 250 parts by weight of glass beads in a paint shaker (manufactured by Toyo Seiki Co., Ltd.) for 30 minutes. After separating the glass beads by filtration, the mixture was dispersed for 3 hours in a high-speed dispersion kneading machine (Dynomill KDL, trade name) at a rotation number of 3,000 rpm. Glass beads (MK-3GX) were used as media. The volume average particle size of pigment particles in the resulting dispersion was measured by ultra-centrifugal automatic particle size distribution analyzer (CAPA700 manufactured by Horiba, Ltd.). As a result, it was found that the pigment particles were well dispersed to 0.17 μm.

<Preparation of Colored Resin Particles>

In a four-necked flask was charged 85.8 g of the filtrate of the processed pigment dispersion (solid content: 23.3%) obtained by separating the glass beads upon filtration, and it was heated with stirring in a nitrogen gas stream at a temperature of 80° C. for 3 hours.

Then, a solution prepared by adding 1.1 g of 2,2'-azobis (2,4-dimethylvaleronitrile) to a mixed solution of 8 g of Dispersion Stabilizer (P-1) described above as powder, 16.0 g of methyl methacrylate, 22.0 g of methyl acrylate, 2.0 g of Macromonomer (M-1) described above and 120 g of Isopar H as a feed solution was dropwise added at a dropping rate of 2.5 ml/min to the processed pigment dispersion, followed by reacting for 3 hours. About 20 minutes after the initiation of the dropwise addition, heat generation occurred, and the temperature of the reaction mixture rose by about 5° C. After the reaction for 3 hours, the temperature was elevated to 90° C., and the reaction mixture was stirred for 2 hours to distill off the unreacted monomers. After cooling, the reaction mixture was filtered through a 200-mesh nylon cloth, and the resulting black resin particle dispersion had a polymerization rate of 98% and an average volume particle size of 0.26 μm. The black resin particle dispersion exhibited a good dispersion state even after preservation by standing for one month.

The black resin particle dispersion was observed by a field emission scanning electron microscope (S-800 Model manufactured by Hitachi, Ltd.). As a result, it was found that the Microlith Black pigment particle of about 100 nm grew to spherical resin particle of about 180 nm after the dispersion polymerization and that the monomers were absorbed on the seed pigment particles and polymerized.

In addition, the black resin particle dispersion was observed by a transmission scanning electron microscope. As a result, it was recognized that the seed pigment particle was incorporated into the spherical colored resin particle of about 180 nm after the dispersion polymerization.

In the light of these results, it can be seen that the colored resin particles formed by seed dispersion polymerization according to the invention have the rosin ester resin-treated pigment incorporated therein.

<Preparation of Ink Composition (IJ-1)>

The above-described colored resin particle dispersion was once concentrated by solvent distillation and then diluted with Isopar G to prepare Ink Composition (IJ-1) having a viscosity of 13 cp (measured at a temperature of 25° C. using an E type viscometer, hereinafter the same) and a surface tension of 23 mN/m (measured at a temperature of 25° C. using an automatic surface tensiometer manufactured by Kyowa Interface Science Co., Ltd., hereinafter the same).

Ink Composition (IJ-1) was charged in a color facsimile (SAIYUKIUX-E1CL manufactured by Sharp Corporation) as an inkjet recording device, and an image was drawn on an exclusive use paper of inkjet paper high-grade manufactured by Fuji Photo Film Co., Ltd. As a result, the discharge was stably conducted without causing nozzle clogging. The resulting image was good and clear without blur and the image density thereof was 1.8. Further, a full solid pattern was printed, and after drying the print, the solid portion thereof was rubbed by fingers. As a result, staining on the fingers was not visually observed at all, so that it was found that the scratch resistance was extremely excellent. The ink composition was free from precipitation and coagulation and extremely good in dispersibility even after preservation for 6 months at room temperature, and it could be continuously used for printing for one month to provide prints having excellent clearness.

EXAMPLE 2

<Preparation of Pigment Dispersion>

A mixture of 100 parts by weight of Carbon Black #30 (manufactured by Mitsubishi Chemical Corporation) as a black pigment and 200 parts by weight of a ethylene/stearyl acrylate copolymer (molar ratio: 95/5) was previously pulverized and well mixed in a trio blender, and then melt-kneaded in a three-roll mill heated at 120° C. for 20 minutes. The kneaded pigment mixture was further pulverized in a pin mill.

A mixture of 10 parts by weight of the resulting kneaded pigment mixture, 65 parts by weight of Isopar G, 25 parts by weight of a 20 wt % solution prepared by dissolving Dispersion Stabilizer (P-5) described above as a pigment dispersant in Isopar G by heating was blended together with 250 parts by weight of glass beads (3G-X) in a paint shaker (manufactured by Toyo Seiki Co., Ltd.) for 60 minutes. After separating the glass beads by filtration, the mixture was dispersed for 3 hours in a high-speed dispersion kneading machine (Dynomill KDL, trade name) at a rotation number of 3,000 rpm. Glass beads (MK-3GX) were used as media. The volume average particle size of pigment particles in the resulting dispersion was measured by ultra-centrifugal automatic particle size distribution analyzer (CAPA700 manufactured by Horiba, Ltd.). As a result, it was found that the pigment particles were well dispersed to 0.18 μm.

<Preparation of Colored Resin Particles>

In a four-necked flask was charged 230.8 g of the filtrate of the pigment dispersion (solid content: 13.0%) obtained by separating the glass beads upon filtration, and it was heated with stirring in a nitrogen gas stream at a temperature of 75° C. for one hour. Then, a solution prepared by adding 0.6 g of 2,2'-azobis (2,4-dimethylvaleronitrile) to a mixed solution of 4 g of Dispersion Stabilizer (P-1) as powder, 5.8 g of methyl methacrylate, 13.2 g of methyl acrylate, 1.0 g of Macromonomer (M-2) described above and 120 g of Isopar H as a feed solution was added dropwise to the pigment dispersion for one hour, followed by reacting for 3 hours. About 15 minutes after the initiation of the dropwise addition, heat generation occurred, and the temperature of the reaction mixture rose by about 4° C. After the reaction for 3 hours, the temperature was elevated to 90° C., and the reaction mixture was stirred for 2 hours while increasing the flow rate of nitrogen to distill off the unreacted monomers. The resulting black resin particle dispersion had a polymerization rate of 95.5% and an average volume particle size of 0.23 μm. The black resin particle dispersion exhibited a good dispersion state even after preservation by standing for one month.

<Preparation of Ink Composition (IJ-2)>

The above-described colored resin particle dispersion was once concentrated by solvent distillation and then diluted with Isobar G to prepare Ink Composition (IJ-2) having a viscosity of 13 cp and a surface tension of 23 mN/m.

Ink Composition (IJ-2) was provided for printing in the same manner as in Example 1 using a color facsimile (SAIYUKI UX-E1CL manufactured by Sharp Corporation). As a result, clear prints of good quality without blur were obtained. Also, the scratch resistance was examined in the same manner as in Example 1, and it was found that staining on fingers was not visually observed at all, so that the scratch resistance was extremely excellent. Even after preservation for 6 months at room temperature, the ink composition was free from precipitation and coagulation and good in dispersibility.

EXAMPLE 3

<Preparation of Pigment Dispersion>

A mixture of 10 parts by weight of Carbon Black #100 (manufactured by Mitsubishi Chemical Corporation) as a black pigment and 100 parts by weight of water were stirred in a flusher, and to the mixture was added 60 parts by weight of a 33% toluene solution of a styrene/vinyl toluene/lauryl methacrylate copolymer (molar ratio: 40/58/2) as a resin for polymer treatment, followed by stirring in the flusher. Then, the system was heated and reduced in pressure to remove the moisture and solvent, thereby obtaining a black block product having a moisture content of 1% by weight. The black block product was dried in vacuo to completely remove the moisture and then pulverized in a sample mill to obtain black powder of from 0.01 to 0.1 mm.

The dispersion of pigment was carried out in the same manner as in Example 2, except for using the black powder described above in place of the kneaded pigment mixture. A black pigment dispersion obtained after separating the glass beads upon filtration had good dispersibility and a volume average particle size thereof was 0.15 μm.

<Preparation of Colored Resin Particles>

The dispersion polymerization was carried out in the same manner as in Example 2 except that the filtrate of the pigment dispersion (solid content: 13.0%) obtained by separating the glass beads upon filtration was used and that Macromonomer (M-3) described above was used in place of Macromonomer (M-2). The resulting black resin particle dispersion had a polymerization rate of 97.0% and an average volume particle size of 0.20 μm. The resulting black resin particle dispersion exhibited a good dispersion state even after preservation by standing for one month.

<Preparation of Ink Composition (IJ-3)>

The above-described colored resin particle dispersion was adjusted so as to have a viscosity of 13 cp and a surface tension of 23 mN/m, whereby Ink Composition (IJ-3) was prepared.

Ink Composition (IJ-3) was provided for printing in the same manner as in Example 1 using a color facsimile (SAIYUKI UX-E1CL manufactured by Sharp Corporation). As a result, clear prints of good quality without blur were obtained. Also, the scratch resistance was examined in the same manner as in Example 1, and it was found that staining on fingers was not visually observed at all, so that the scratch resistance was extremely excellent. Even after preservation for 6 momths at room temperature, the ink composition was free from precipitation and coagulation and good in dispersibility.

Comparative Example 1

<Preparation of Comparative Pigment Dispersion>

A mixture of 5 parts by weight of Alkali Blue as a blue pigment, which had not been subjected to the surface treatment according to the invention, 5 parts by weight of a lauryl methacrylate/acrylic acid copolymer (composition ratio: 95/5 by weight) as a pigment dispersant and 90 parts by weight of Isopar H was blended together with 250 parts by weight of glass beads in a paint shaker (manufactured by Toyo Seiki Co., Ltd.) for 30 minutes. After separating the glass beads by filtration, the mixture was dispersed for 3 hours in a high-speed dispersion kneading machine (Dynomill KDL, trade name) at a rotation number of 3,000 rpm. The volume average particle size of pigment particles in the resulting dispersion was measured by ultra-centrifugal automatic particle size distribution analyzer (CAPA700 manufactured by Horiba, Ltd.). As a result, it was found that the pigment particles were well dispersed to 0.13 $\mu$m.

<Preparation of Comparative Colored Resin Particles>

In a four-necked flask was charged 208.3 of the filtrate of the pigment dispersion (solids content: 9.6%) obtained by separating the glass beads upon filtration, and it was heated with stirring in a nitrogen gas stream at a temperature of 80° C. for 3 hours. Then, a solution prepared by adding 1.1 g of 2,2'-azobis (2,4-dimethylvaleronitrile) to a mixed solution of 8 g of Dispersion Stabilizer (P-1), 16.0 g of methylmethacrylate, 22.0 g of methyl acrylate, 2 g of Macromonomer (M-1) and 120 g of Isopar H as a feed solution was dropwise added at a dropping rate of 2.5 ml/min to the pigment dispersion, followed by reacting for 3 hours. About 15 minutes after the initiation of the dropwise addition, heat generation occurred, and the temperature of the reaction mixture rose by about 5° C. Coarse particles adhered to the inner wall surface of the flask, and after the reaction, a large amount of precipitate was found in the bottom of the flask. The colored resin particles could not be provided for the subsequent preparation of ink composition because of the formation of coarse particles and precipitate.

It was understood from the results of Examples 1 to 3 and Comparative Example 1 that since the polymer-treated coloring agent according to the invention is made in the state of fine particles and has good dispersibility, the seed dispersion polymerization proceeds well, and the colored resin particles containing the polymer-treated coloring agent therein formed by the seed dispersion polymerization have good ink characteristics, for example, clear printed image quality, extremely excellent scratch resistance and good long-term dispersibility.

EXAMPLE 4

<Preparation of Pigment Dispersion>

A mixture of 100 parts by weight of Carbon Black #30 (manufactured by Mitsubishi Chemical Corporation) as a black pigment and 200 parts by weight of a methyl methacrylate/stearyl methacrylate copolymer (molar ratio: 9/1) was previously pulverized and well mixed in a trio blender, and then melt-kneaded in a three-roll mill heated at 120° C. for 20 minutes. The kneaded pigment mixture was further pulverized in a pin mill.

A mixture of 10 parts by weight of the resulting kneaded pigment mixture, 65 parts by weight of Isopar G, 25 parts by weight of a 20 wt % solution prepared by dissolving Solprene 1205 (styrene/butadiene copolymer, manufactured by Asahi Kasei Corporation) as a pigment dispersant in Isopar G by heating was blended together with 250 parts by weight of glass beads (3G-X) in a paint shaker (manufactured by Toyo Seiki Co., Ltd.) for 60 minutes. After separating the glass beads by filtration, the mixture was dispersed for 3 hours in a high-speed dispersion kneading machine (Dynomill KDL, trade name) at a rotation number of 3,000 rpm. Glass beads (MK-3GX) were used as media. The volume average particle size of pigment particles in the resulting dispersion was measured by ultra-centrifugal automatic particle size distribution analyzer (CAPA700 manufactured by Horiba, Ltd.). As a result, it was found that the pigment particles were well dispersed to 0.21 $\mu$m.

<Preparation of Colored Resin Particles>

Ina four-necked flask was charged 214.3 g of the filtrate of the pigment dispersion (solid content: 14.0%) obtained by separating the glass beads upon filtration, and it was heated with stirring in a nitrogen gas stream at a temperature of 50° C. for one hour. Then, a solution prepared by adding 0.7 g of 2,2'-azobis(4-methoxy-2,4-dimethylvaleronitrile) to a mixed solution of 2 g of Dispersion Stabilizer (P-1) as powder, 19.6 g of methyl acrylate, 0.4 g of Macromonomer (M-1) and 80 g of Isopar H as a feed solution was added dropwise to the processed pigment dispersion for one hour, followed by reacting for 3 hours. About 20 minutes after the initiation of the dropwise addition, heat generation occurred, and the temperature of the reaction mixture rose by about 5° C. After the reaction for 3 hours, the temperature was elevated from 50° C. to 80° C., and the reaction mixture was stirred for 2 hours while increasing the flow rate of nitrogen to distill off the unreacted monomers. After cooling, the reaction mixture was filtered through a 200-mesh nylon cloth, and the resulting black resin particle dispersion had a polymerization rate of 98% and an average volume particle size of 0.26 $\mu$m. The black resin particle dispersion exhibited a good dispersion state even after preservation by standing for one month.

<Preparation of Ink Composition (IJ-4)>

The above-described colored resin particle dispersion was once concentrated by solvent distillation and then diluted with Isobar G to prepare Ink Composition (IJ-4) having a viscosity of 13 cp and a surface tension of 23 mN/m.

Ink Composition (IJ-4) was provided for printing in the same manner as in Example 1 using a color facsimile (SAIYUKI UX-E1CL manufactured by Sharp Corporation). As a result, clear prints of good quality without blur were obtained. Also, the scratch resistance was examined in the same manner as in Example 1, and it was found that staining on fingers was not visually observed at all, so that the scratch resistance was extremely excellent. Even after preservation for 6 months at room temperature, the ink composition was free from precipitation and coagulation and good in dispersibility.

Comparative Example 4

<Preparation of Comparative Ink Composition (IJR-1)>

Comparative Ink Composition (IJR-1) was prepared in the same manner as in the preparation of Ink Composition (IJ-4) except that the pigment dispersion of seed particles prepared in Example 4 was used in place of the colored resin particles of Example 4. The comparative ink composition (IJR-1) had a viscosity of 12 cp and a surface tension of 23 mN/m.

Comparative Ink Composition (IJR-1) was provided for printing in the same manner as in Example 1 using a color facsimile (SAIYUKI UX-E1CL manufactured by Sharp Corporation). As a result, clear prints without blur were obtained. However, when the solid image portion was rubbed by fingers, the image portion was easily removed. Thus, it was found that the scratch resistance was extremely poor. In order to obtain the printed image portion free from the removal by rubbing with fingers, it was recognized that the printed recording material must be fixed upon heating at 120° C. or higher.

It can be understood from the results of Ink Composition (IJ-4) of the invention and Comparative Ink Composition (IJR-1) that the colored resin particles coated with a low-softening resin prepared by the seed dispersion polymerization using the polymer-treated pigment as seed particles in the invention exhibit good ink characteristics, for example, clear printed image quality, ease of fixing, extremely excellent scratch resistance and good long-term dispersibility.

EXAMPLE 5

<Preparation of Pigment Dispersion>

The pigment dispersion was carried out in the same manner as in Example 1 except that a yellow pigment (Microlith Yellow 3R-T manufactured by Ciba Specialty Chemicals) was used in place of the black pigment (Microlith Black C-T Ciba Specialty Chemicals). A yellow pigment dispersion obtained after separating the glass beads upon filtration had good dispersibility and a volume average particle size thereof was 0.22 $\mu$m.

<Preparation of Colored Resin Particles>

In a four-necked flask was charged 100 g of the yellow pigment dispersion (solid content: 20.0%) and it was heated with stirring in a nitrogen gas stream at a temperature of 80° C. for 2 hours. Then, the same procedures as in Example 1 were carried out except that a solution prepared by adding 0.56 g of 2,2'-azobis(2,4-dimethylvaleronitrile) to a mixed solution of 6 g of Dispersion Stabilizer (P-5) as powder, 8.0 g of methyl methacrylate, 13.2 g of methyl acrylate, 1.0 g of Macromonomer (M-3) described above and 80 g of Isopar H as a feed solution was dropwise added at a dropping rate of 2.0 ml/min to the pigment dispersion, followed by reacting for 3 hours. The temperature of the reaction mixture rose by about 4° C. The resulting yellow resin particle dispersion had a polymerization rate of 97% and an average volume particle size of 0.30 $\mu$m and exhibited a good dispersion state even after preservation by standing for one month.

<Preparation of Ink Composition (IJ-5)>

The yellow resin particle dispersion was diluted with Isopar G to make the content of the resin particles 6.0%. Then, octadecene/semi-maleic acid octadecylamide copolymer as a charge control agent was added in an amount of 0.01 g per liter of Isopar G to prepare Ink Composition (IJ-5).

Measurement of the charge amount of Ink Composition (IJ-5) was conducted using a development characteristic measurement device (measuring the initial value of voltage change with time, which is induced on the back surface of an electrode to which a voltage of 500 V is applied) as described in JP-B-64-696. Ink Composition (IJ-5) exhibited the distinct positive charge property such that the entire charge was 256 mV and the charge of yellow resin particle was 220 mV. Further, it was found that Ink Composition (IJ-5) was substantially free from change in the charge amount and extremely stable even after preservation for one month. It was also recognized that the charge amount could be easily adjusted by the amount of charge control agent used.

Comparative Example 5

<Preparation of Comparative Ink Composition (IJR-2)>

Comparative Ink Composition (IJR-2) was prepared in the same manner as in the preparation of Ink Composition (IJ-5) of Example 5 except for using the yellow pigment dispersion of seed particles itself. The charge amount of Comparative Ink Composition (IJR-2) was measured in the same manner as in Example 5. As a result, it was found that Comparative Ink Composition (IJR-2) was negatively charged, and the entire charge was 95 mV and the charge of yellow pigment particle was 15 mV.

It can be understood from the results of Example 5 and Comparative Example 5 that although the yellow pigment (Microlith Yellow 3R-T) in Comparative Ink Composition (IJR-2) as the seed particle is originally negatively charged, the colored resin particles coated with the resin by the seed dispersion polymerization in Ink Composition (IJ-5) according to the invention exhibit the distinct positive polarity and that the charge amount thereof can be easily adjusted by the amount of charge control agent. Specifically, it can be seen that by coating the pigment surface with the resin by the seed dispersion polymerization, the charge polarity (by appropriately selecting the charge control agent) and the charge amount can be freely adjusted, regardless of the original charge polarity of pigment.

<Image Drawing Property>

An inkjet device equipped with 64-channel (100 dpi) electrostatic inkjet heads each having the structure as shown in FIG. 1 was used, and Ink Composition (IJ-5) was charged in an ink tank thereof. After removing dusts on the surface of coated recording paper as a recording medium by air pump suction, the discharge heads were moved to a drawing position toward the coated recording paper and the ink was discharged at a drawing resolution of 600 dpi to draw an image. The drawing was conducted while changing dot areas at 16 stages in the dot size ranging from 15 $\mu$m to 60 $\mu$m by means of regulating the pulse voltage. The image obtained was clear and of good quality having the satisfactory density without blur. The discharge stability from ink head was good, no clogging occurred, and dot-form printing could be stably conducted in the image drawing. Further, the scratch resistance was examined in the same manner as in Example 1. As a result, staining on fingers was not visually observed at all, so that it was noted that the scratch resistance was extremely excellent. Even after preservation for 6 months at room temperature, Ink Composition (IJ-5) was free from precipitation and coagulation and good in dispersibility.

On the other hand, using Comparative Ink Composition (IJR-2), image drawing was conducted in the same manner as above but changing the pulse voltage applied to the head to a negative polarity. As a result, the image obtained exhibited severe blur and low density. Further, since discharge failure occurred during the image drawing, lack of images were observed, and thus satisfactory image was not obtained.

It can be understood from these results that since the pigment resin particles coated with the resin by the seed dispersion polymerization in Ink Composition (IJ-5) according to the invention exhibit the distinct positive property and have the sufficient charge amount, Ink Composition (IJ-5) has good ink characteristics, for example, clear printed image quality, good discharge stability, extremely excellent scratch resistance and good long-term dispersibility in case of using in the electrostatic inkjet device.

Isopar G and 1% by mole, based on the polymerizable monomer(s), of 2,2'-azobis(2,4-dimethylvaleronitrile) was added dropwise as a feed solution over a period of 2 hours. The temperature of each of the reaction mixtures rose by about 3 to 8° C. The resulting blue particle resin dispersions 7 to 20 had a polymerization rate of from about 90 to 98% and an average volume particle size of from 0.20 to 0.28 μm, respectively. Further, each of the blue particle dispersions 7 to 20 exhibited a good dispersion state even after preservation by standing for one month.

TABLE E

| Example | Polymerizable Monomer Component | | | | | | Dispersion Stabilizer |
|---|---|---|---|---|---|---|---|
| | (A) | | (A) | | (M) and (B) | | |
| 7 | Methyl methacrylate: | 20.0 g | Methyl acrylate: | 18.0 g | Macromonomer (M-3): | 2.0 g | P-4 |
| 8 | Methyl methacrylate: | 23.0 g | Ethyl acrylate: | 15.0 g | Macromonomer (M-3): | 2.0 g | P-10 |
| 9 | Methyl methacrylate: | 29.0 g | Butyl acrylate: | 9.0 g | Macromonomer (M-3): | 2.0 g | P-15 |
| 10 | Ethyl methacrylate: | 25.0 g | Methyl acrylate: | 13.0 g | Macromonomer (M-6): | 2.0 g | P-6 |
| 11 | Methyl methacrylate: | 20.0 g | Methyl acrylate: | 18.0 g | Macromonomer (M-7): | 2.0 g | P-12 |
| 12 | Methyl methacrylate: | 20.0 g | Methyl acrylate: | 18.0 g | Macromonomer (M-11): | 2.0 g | P-13 |
| 13 | Methyl methacrylate: | 20.0 g | Methyl acrylate: | 18.0 g | Macromonomer (M-15): | 2.0 g | P-19 |
| 14 | Methyl methacrylate: | 18.0 g | Methyl acrylate: | 18.0 g | DMAEMA: | 2.0 g | P-21 |
| | | | | | Macromonomer (M-1): | 2.0 g | |
| 15 | Methyl methacrylate: | 17.0 g | Methyl acrylate: | 17.0 g | DMAEMA: | 4.0 g | P-24 |
| | | | | | Macromonomer (M-1): | 2.0 g | |
| 16 | Methyl methacrylate: | 18.5 g | Methyl acrylate: | 18.5 g | DEAPMA: | 2.0 g | P-2 |
| | | | | | Macromonomer (M-1): | 2.0 g | |
| 17 | Methyl methacrylate: | 18.5 g | Methyl acrylate: | 18.5 g | DEAEMA: | 2.0 g | P-16 |
| | | | | | Macromonomer (M-1): | 2.0 g | |
| 18 | — | | Methyl acrylate: | 38.0 g | Macromonomer (M-2): | 2.0 g | P-1 |
| 19 | Methyl methacrylate: | 18.1 g | Methyl acrylate: | 15.5 g | Macromonomer (M-2): | 2.0 g | P-12 |
| | | | Styrene: | 4.4 g | | | |
| 20 | Methyl methacrylate: | 18.0 g | Methyl acrylate: | 18.0 g | Macromonomer (M-2): | 2.0 g | P-2 |
| | | | Vinyl toluene: | 2.0 g | | | |

DMAEMA: 2-(dimethylamine)ethyl methacrylate
DEAEMA: 2-(diethylamine)ethyl methacrylate
DEAPMA: 2-(diethylamine)propyl methacrylate

EXAMPLES 7 TO 20

<Preparation of Pigment Dispersion>

The pigment dispersion was carried out in the same manner as in Example 1 except that Dispersion Stabilizer (P-21) was used as a pigment dispersant in an amount of 50 wt % based on the processed pigment in place of Dispersion Stabilizer (P-1) and that a blue processed pigment (Microlith Blue 4G-T manufactured by Ciba Specialty Chemicals) in place of the black processed pigment (Microlith Black C-T). A pigment dispersion obtained after separating the glass beads upon filtration had good dispersibility and a volume average particle size thereof was 0.16 μm. Using the blue pigment dispersion, the seed dispersion polymerization was conducted to prepare colored resin particles and Ink Compositions (IJ-7) to (IJ-20) as described below.

<Preparation of Colored Resin Particles>

The same reaction operations as in Example 1 were followed except that 157.5 g of the blue processed pigment dispersion (solid content: 19.1%) was used and that a solution containing 8 g of a dispersion stabilizer (P) as powder and 40 g of the polymerizable monomer(s) including a macromonomer (M) as shown in Table E below, 80 g of <Preparation of Ink Compositions (IJ-7) to (IJ-20)>

The above-described colored resin particle dispersions were each adjusted so as to have a viscosity of from 12 to 14 cp and a surface tension of from 22 to 24 mN/m to prepare Ink Compositions (IJ-7) to (IJ-20).

Each of Ink Compositions (IJ-7) to (IJ-20) was provided for printing in the same manner as in Example 1 using a color facsimile (SAIYUKI UX-E1CL manufactured by Sharp Corporation). As a result, clear prints of good quality having a satisfactory density without blur were obtained. Further, the staining on fingers was not visually observed at all, so that it was noted that the scratch resistance was extremely excellent. Even after preservation for 6 months at room temperature, Ink Compositions (IJ-7) to (IJ-20) were free from precipitation and coagulation and good in dispersibility.

EXAMPLE 21

<Preparation of Pigment Dispersion and Colored Resin Particles>

Colored resin particles were prepared by the seed dispersion polymerization shown below using the blue processed pigment dispersion of Example 7.

The same reaction operations as in Example 1 were followed except that 157.5 g the blue processed pigment dispersion (solid content: 19.1%) was used and that a solution of 8 g of Dispersion Stabilizer (P-26) having the structure shown below as powder, 19.0 g of ethyl methacrylate, 19.0 g of methyl acrylate, 2.0 g of Macromonomer (M-1), 80 g of Isobar G and 1% by mole, based on the polymerizable monomers, of 2,2'-azobis(2,4-dimethylvaleronitrile) was added dropwise as a feed solution over a period of 2 hours. The temperature of the reaction mixture rose by about 4.° C. The resulting blue resin particle dispersion 21 had a polymerization rate of about 93% and an average volume particle size of 0.25 μm. Further, the blue resin particle dispersion 21 exhibited a good dispersion state even after preservation by standing for one month.

(Preparation of Dispersion Stabilizer (P-26))

A mixture of 70 g of octadecyl methacrylate and 2.0 g of benzyl N,N-diethyldithiocarbamate was sealed in a vessel in a nitrogen gas stream and heated at a temperature of 60° C. The mixture was subjected to polymerization upon irradiation with light emitting from a 400-W high pressure mercury vapor lamp at a distance of 10 cm through a glass filter for 10 hours. To the mixture were added 30 g of styrene monomer and 180 g of methyl ethyl ketone, and after purging with nitrogen, the mixture was again irradiated with light for 10 hours. The resulting reaction mixture was reprecipitated in 3 liters of methanol, and the precipitate was collected and dried in vacuo to obtain Dispersion Stabilizer (P-26) having a weight average molecular weight of 90,000 in a yield of 78.0 g.

Dispersion Stabilizer (P-26)

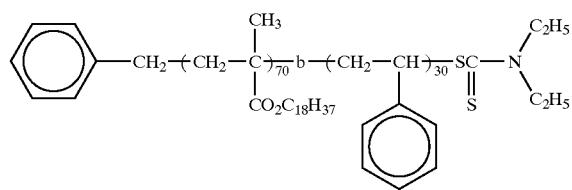

<Preparation of Ink Composition (IJ-21)>

The above-described colored resin particle dispersion was adjusted so as to have a viscosity of 12 cp and a surface tension of 24 mN/m to prepare Ink Composition (IJ-21).

Ink Composition (IJ-21) was provided for printing in the same manner as in Example 1 using a color facsimile (SAIYUKI UX-E1CL manufactured by Sharp Corporation). As a result, it was found that Ink Composition (IJ-21) provided clear prints of good quality having a satisfactory density without blur. Further, the staining on fingers was not visually observed at all, so that that the scratch resistance was extremely excellent. Even after preservation for 6 months at room temperature, Ink Composition (IJ-21) was free from precipitation and coagulation and good in dispersibility.

EXAMPLE 22

Ink Composition (IJ-5) obtained in Example 5 was used as an electrophotographic liquid developer, and printing test was conducted using a wet type copying machine (DT-2500 manufactured by Ricoh Co., Ltd). As a result, an image having a sufficient image density and good fixing property was obtained.

Further, the electrophotographic liquid developer exhibited an extremely small change in the charge with the lapse of time and was excellent in redispersibility and storage stability.

According to the ink composition of the invention, which contains pigment-containing resin particles obtained by seed dispersion polymerization of polymerizable monomers including the macromonomer (M) with a polymer-treated pigment as a seed particle in a non-aqueous solvent, an oil based ink for inkjet printer in which the pigment is uniformly dispersed in the state of fine particle and dispersion stability of the pigment dispersion is excellent can be obtained. Further, an oil based ink for inkjet printer having high discharge stability without the occurrence of clogging in a nozzle section can be obtained. Moreover, an oil based ink for inkjet printer having excellent drying property on recording paper, excellent water resistance and light fastness of recorded image, and high-level scratch resistance can be obtained. Also, an oil based ink for use in an electrostatic inkjet printer or an electrophotographic liquid developer, which is excellent not only in dispersion stability and scratch resistance but also in control of charge polarity and charge stability with the lapse of time can be obtained. In addition, according to the invention, a process of producing an oil based ink for inkjet printer, which comprises resin particles having the above-described characteristics and containing a pigment therein uniformly dispersed in the state of fine particle is provided.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. An oil based ink composition for inkjet printer comprising colored resin particles obtained by dispersion polymerization of a monofunctional polymerizable monomer (A) and a macromonomer (M) copolymerizable with the monomer (A) with coloring component fine particles comprising a surface-treated coloring agent, which are dispersed in a non-aqueous solvent having a dielectric constant of from 1.5 to 20 and a surface tension of from 15 to 60 mN/m at 25° C., as seed particles, in the presence of a dispersion stabilizer (P) soluble in the non-aqueous solvent and a polymerization initiator.

2. The oil based ink composition for inkjet printer as claimed in claim 1, wherein the macromonomer (M) is a macromonomer having a weight average molecular weight of from $1 \times 10^3$ to $4 \times 10^4$ in which a polymerizable double bond group represented by formula (I) shown below is connected to a terminal of the main chain of a polymer comprising a repeating unit represented by formula (II) shown below:

wherein V represents —COO—, —OCO—, —$(CH_2)_m$—OCO—, —$(CH_2)_m$—COO—, —O—, —CONHCOO—, —CONHCO—, —$SO_2$—, —CO—, —CON($Z^1$)-, —$SO_2$N($Z^1$)- or a phenylene group; $Z^1$ represents a hydrogen atom or a hydrocarbon group; m represents an integer of from 1 to 3; $a^1$ and $a^2$, which may be the same or different, each represent a hydrogen atom, a halogen atom, a cyano group, a hydrocarbon group, —COO-$Z^2$ or —COO-$Z^2$ linked through a hydrocarbon group; and $Z^2$ represents a hydrogen atom or a hydrocarbon group:

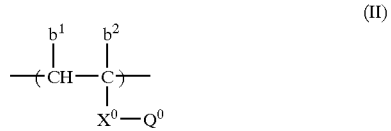
(II)

wherein $X^0$ represents a connecting group selected from —COO—, —OCO—, —(CH$_2$)$_n$—OCO—, —(CH$_2$)$_n$—COO—, —O—, —CONHCOO—, —CONHCO—, —SO$_2$—, —CO—, —CON($Z^3$)- and —SO$_2$N($Z^3$)-; $Z^3$ represents a hydrogen atom or a hydrocarbon group; n represents an integer of from 1 to 3; $b^1$ and $b^2$, which may be the same or different, each have the same meanings as defined for $a^1$ and $a^2$ of formula (I); and $Q^0$ represents an aliphatic group having from 1 to 22 carbon atoms.

3. The oil based ink composition for inkjet printer as claimed in claim 1, wherein the surface-treated coloring agent is an organic or inorganic pigment coated with a polymer.

4. The oil based ink composition for inkjet printer as claimed in claim 1, wherein the coloring component fine particles are those dispersed with a pigment dispersant in the non-aqueous solvent and having an average particle diameter of from 0.01 to 1.0 μm.

5. An electrophotographic liquid developer comprising colored resin particles obtained by dispersion polymerization of a monofunctional polymerizable monomer (A) and a macromonomer (M) copolymerizable with the monomer (A) with coloring component fine particles comprising a surface-treated coloring agent, which are dispersed in a non-aqueous solvent having a volume resistivity of $10^9$ Ωcm or more, as seed particles, in the presence of a dispersion stabilizer (P) soluble in the non-aqueous solvent and a polymerization initiator.

6. The electrophotographic liquid developer as claimed in claim 5, wherein the macromonomer (M) is a macromonomer having a weight average molecular weight of from $1 \times 10^3$ to $4 \times 10^4$ in which a polymerizable double bond group represented by formula (I) shown below is connected to a terminal of the main chain of a polymer comprising a repeating unit represented by formula (II) shown below:

(I)

wherein V represents —COO—, —OCO—, —(CH$_2$)$_m$—OCO—, —(CH$_2$)$_m$—COO—, —O—, —CONHCOO—, —CONHCO—, —SO$_2$—, —CO—, —CON($Z^1$)-, —SO$_2$N($Z^1$)- or a phenylene group; $Z^1$ represents a hydrogen atom or a hydrocarbon group; m represents an integer of from 1 to 3; $a^1$ and $a^2$, which may be the same or different, each represent a hydrogen atom, a halogen atom, a cyano group, a hydrocarbon group, —COO-$Z^2$ or —COO-$Z^2$ linked through a hydrocarbon group; and $Z^2$ represents a hydrogen atom or a hydrocarbon group:

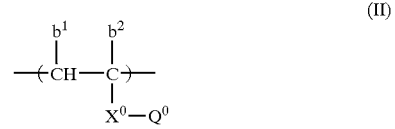
(II)

wherein $X^0$ represents a connecting group selected from —COO—, —OCO—, —(CH$_2$)$_n$—OCO—, —(CH$_2$)$_n$—COO—, —O—, —CONHCOO—, —CONHCO—, —SO$_2$—, —CO—, —CON($Z^3$)- and —SO$_2$N($Z^3$)-; $Z^3$ represents a hydrogen atom or a hydrocarbon group; n represents an integer of from 1 to 3; $b^1$ and $b^2$, which may be the same or different, each have the same meanings as defined for $a^1$ and $a^2$ of formula (I); and $Q^0$ represents an aliphatic group having from 1 to 22 carbon atoms.

7. The electrophotographic liquid developer as claimed in claim 5, wherein the surface-treated coloring agent is an organic or inorganic pigment coated with a polymer.

8. The electrophotographic liquid developer as claimed in claim 5, wherein the coloring component fine particles are those dispersed with a pigment dispersant in the non-aqueous solvent and having an average particle diameter of from 0.01 to 1.0 μm.

9. The oil based ink composition for inkjet printer as claimed in claim 1, wherein the colored resin particle has a two-layer structure comprising a core layer comprising the coloring component fine particle and a shell layer comprising a polymer formed by copolymerization of the monomer (A) and the macromonomer (M).

* * * * *